(12) United States Patent
Yoon et al.

(10) Patent No.: US 9,704,386 B2
(45) Date of Patent: Jul. 11, 2017

(54) MOBILE TERMINAL AND CONTROLLING METHOD THEREOF

(71) Applicant: LG ELECTRONICS INC., Seoul (KR)

(72) Inventors: Sunghye Yoon, Seoul (KR); Sujin Kim, Seoul (KR); Jumin Chi, Seoul (KR); Jiyoung Park, Seoul (KR); Jaeho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 195 days.

(21) Appl. No.: 14/445,779

(22) Filed: Jul. 29, 2014

(65) Prior Publication Data
US 2015/0061842 A1 Mar. 5, 2015

(30) Foreign Application Priority Data
Aug. 29, 2013 (KR) ........................ 10-2013-0103008

(51) Int. Cl.
*G08C 17/02* (2006.01)
*G06F 3/01* (2006.01)
(Continued)

(52) U.S. Cl.
CPC .............. *G08C 17/02* (2013.01); *G04G 21/04* (2013.01); *G06F 3/015* (2013.01); *G06F 3/017* (2013.01);
(Continued)

(58) Field of Classification Search
CPC ........ G08C 17/02; G04G 21/04; G06F 3/015; G06F 3/017
(Continued)

(56) References Cited

U.S. PATENT DOCUMENTS 7,030,861 B1 4/2006 Westerman et al.
2004/0174431 A1* 9/2004 Stienstra ................. G06F 3/011
348/155
(Continued)

FOREIGN PATENT DOCUMENTS

CN 1296797 C 1/2007
CN 102349037 A 2/2012
(Continued)

OTHER PUBLICATIONS

Morganti et al., "A smart watch with embedded sensors to recognize objects, grasps and forearm gestures", Procedia Engineering, vol. 41, Jan. 1, 2012, pp. 1169-1175.

*Primary Examiner* — Yong Hang Jiang
(74) *Attorney, Agent, or Firm* — Birch, Stewart, Kolasch & Birch, LLP

(57) ABSTRACT

A mobile terminal and controlling method thereof are disclosed, by which a mobile terminal of a watch type or an external device can be remotely controlled. The present invention includes a display unit configured to display information, a wireless communication unit configured to communicate with an external device as a target of a remote control, a sensing unit configured to sense a motion of the mobile terminal and a variation according to a muscle movement of a part having the mobile terminal worn thereon, and a controller creating a control command for remotely controlling either the mobile terminal and the external device based on a sensing signal of the sensing unit.

15 Claims, 44 Drawing Sheets

(51) Int. Cl.
*G04G 21/04* (2013.01)
*H04M 1/725* (2006.01)
*G06F 3/0484* (2013.01)

(52) U.S. Cl.
CPC ...... *G06F 3/04842* (2013.01); *G08C 2201/32* (2013.01); *H04M 1/72533* (2013.01)

(58) Field of Classification Search
USPC .............................................. 340/12.5, 12.22
See application file for complete search history.

(56) References Cited

U.S. PATENT DOCUMENTS

| | | | | |
|---|---|---|---|---|
| 2010/0278393 | A1* | 11/2010 | Snook | G06F 3/011 382/107 |
| 2012/0105312 | A1* | 5/2012 | Helmes | G06F 3/016 345/156 |
| 2012/0151400 | A1* | 6/2012 | Hong | G06F 3/04817 715/769 |
| 2012/0188158 | A1 | 7/2012 | Tan et al. | |
| 2012/0272193 | A1* | 10/2012 | Michaelis | B60K 37/06 715/863 |
| 2013/0085761 | A1* | 4/2013 | Bringert | G06F 3/167 704/275 |
| 2014/0081659 | A1* | 3/2014 | Nawana | A61B 19/50 705/3 |

FOREIGN PATENT DOCUMENTS

| | | |
|---|---|---|
| EP | 2 632 131 A | 8/2013 |
| WO | WO 2011/055326 A1 | 5/2011 |
| WO | WO 2011/070554 A2 | 6/2011 |

* cited by examiner (a)　　　　　　　　　　　(b)

FIG. 7

| Hand action | Knock on a floor surface with folded fingers | Scratch a floor with a single finger | Tap a floor with two fingers | Tap a floor with at least four fingers | Hit a floor with a fist |
|---|---|---|---|---|---|
| Related drawing | 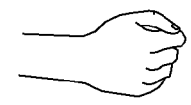 |  | 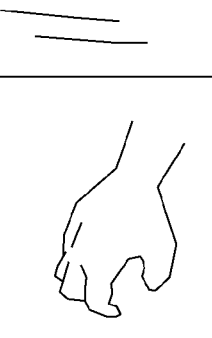 | 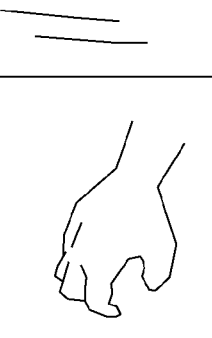 |  |
| Function | Power saving mode | Cursor movement | Left click (select) | Right click (menu paging/long press) | Home paging/End |

| Hand action | Increase a distance between two fingers | Decrease a distance between two fingers | Move a finger up and down | Move a finger left and right | Rub a floor with a palm | Wave a hand in the air |
|---|---|---|---|---|---|---|
| Related drawing |  | 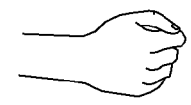 |  |  | 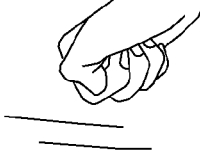 | |
| Function | Zoom-in | Zoom-out | Horizontal (vertical) scroll | vertical (Horizontal) scroll | Erase an inputted text (handwriting) | Turn a page |

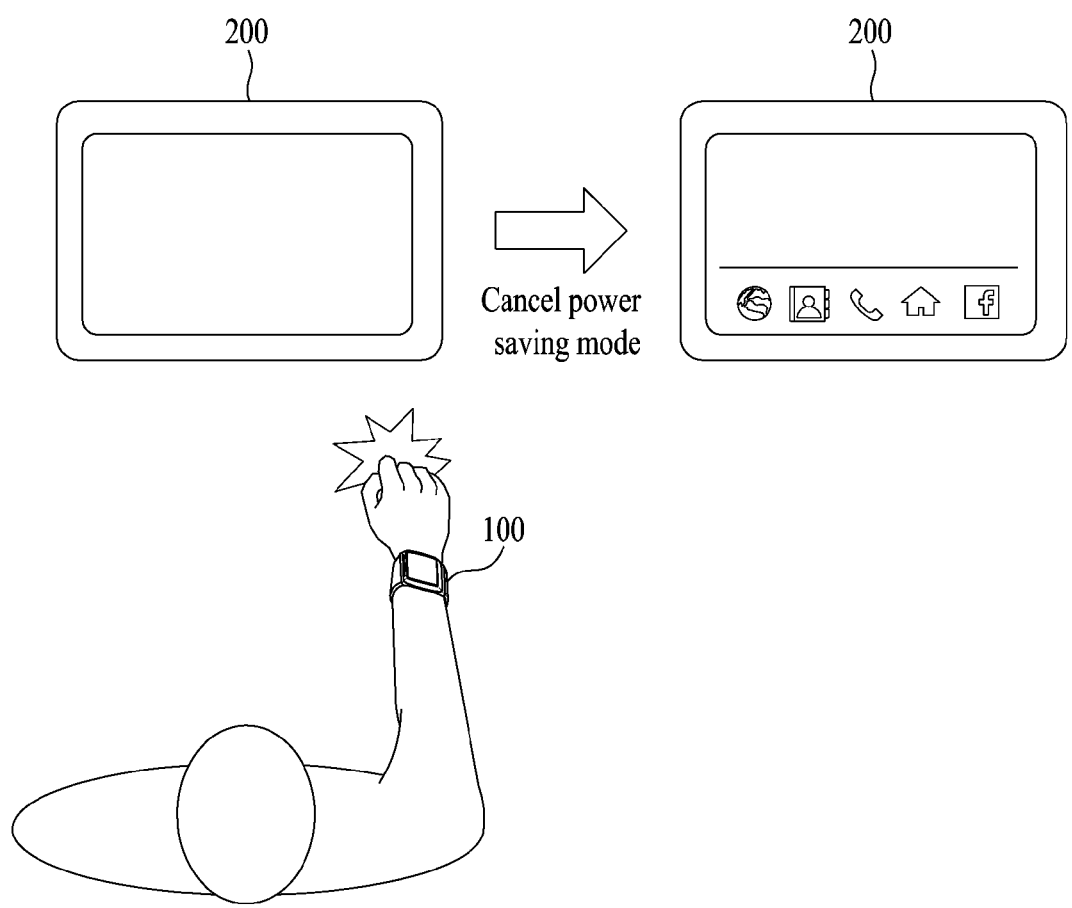

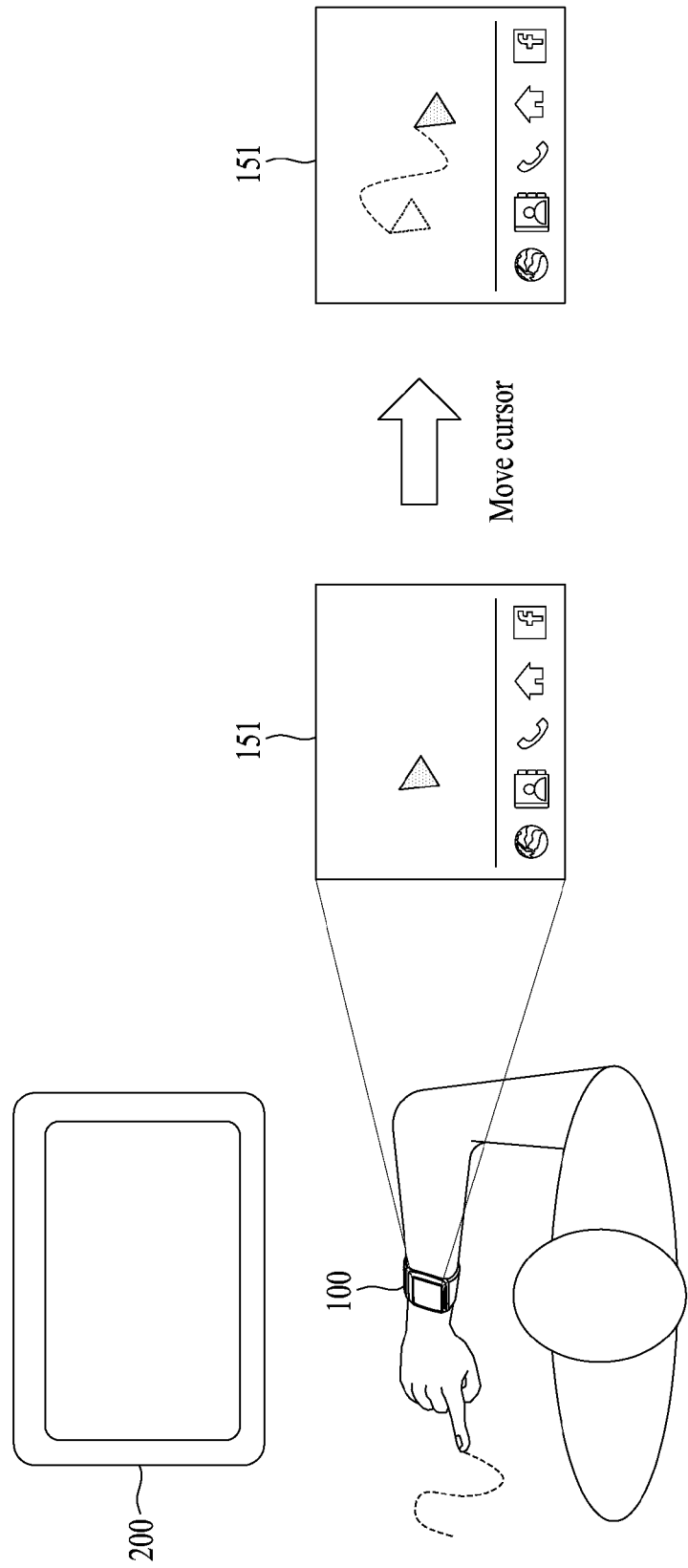

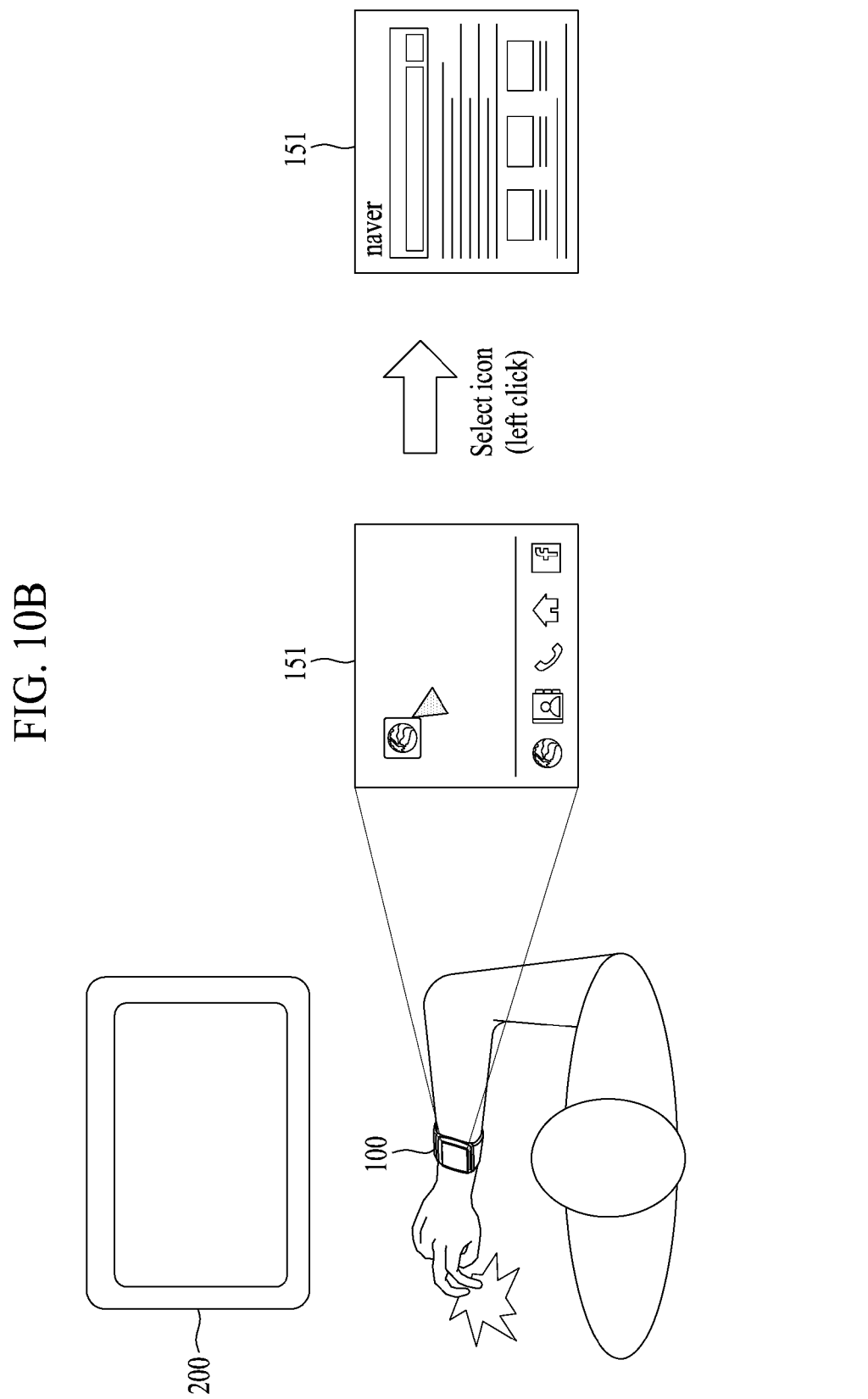

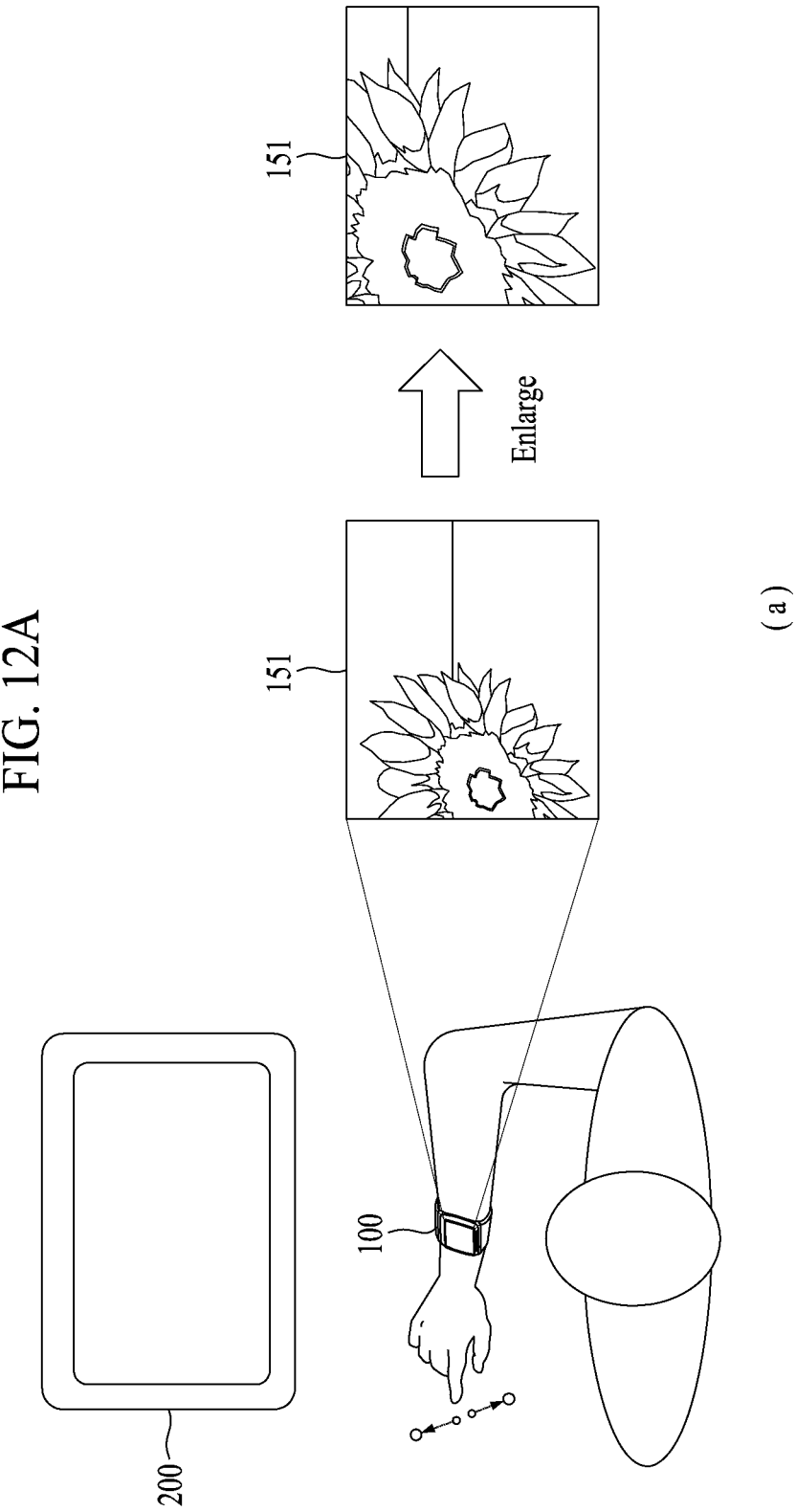

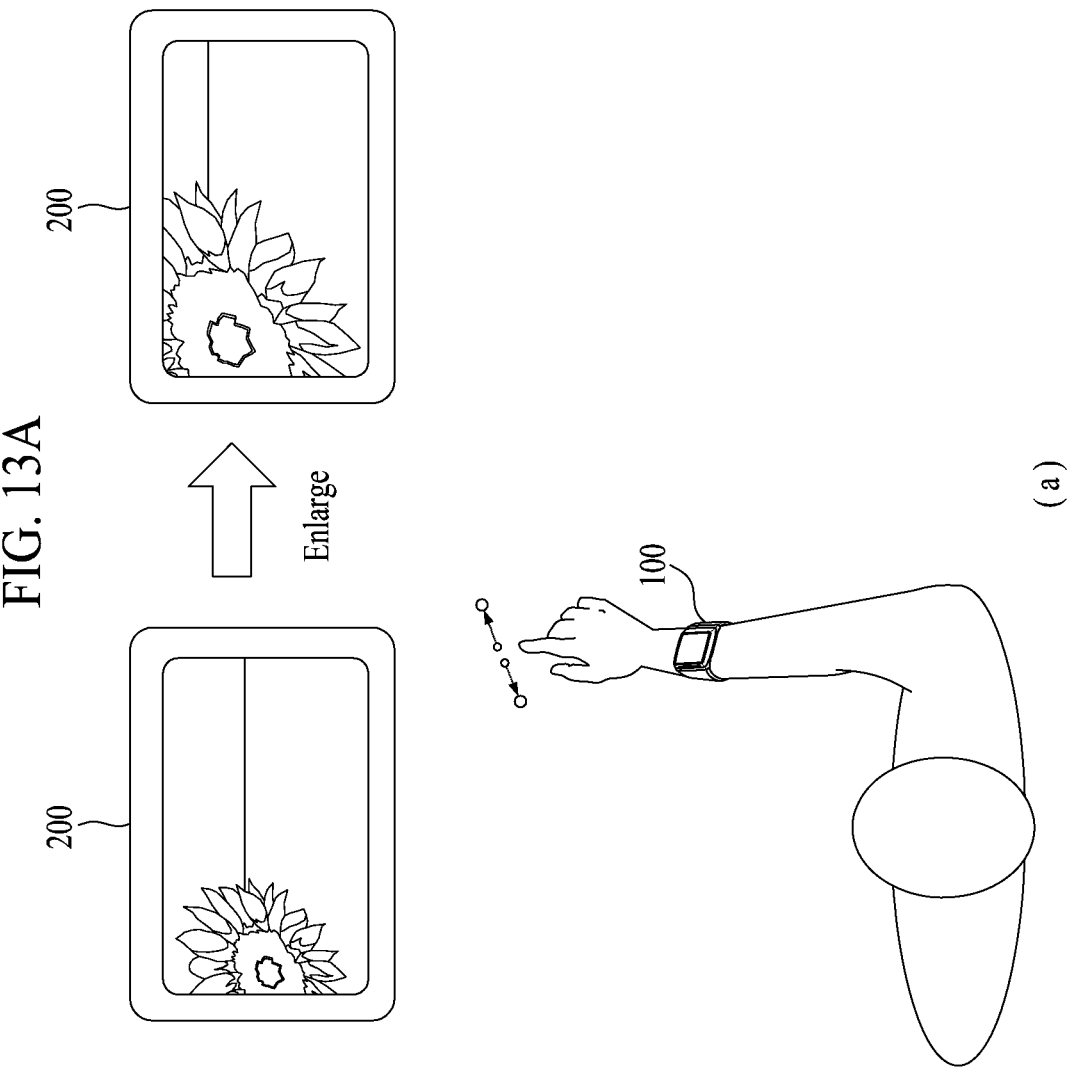

(b)

(b)

FIG. 15A
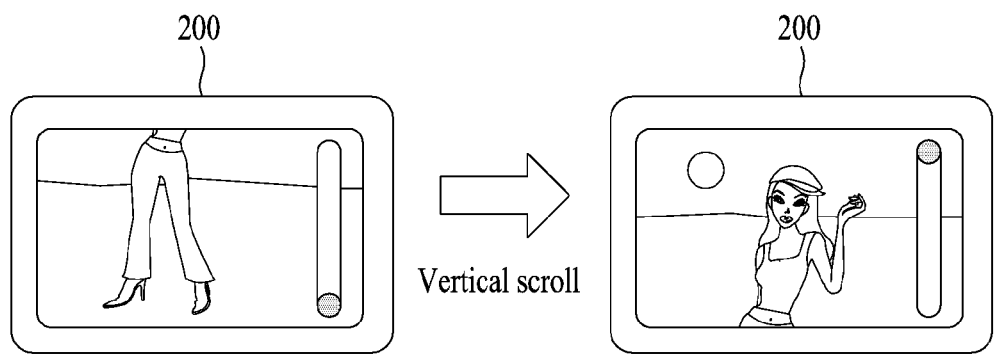
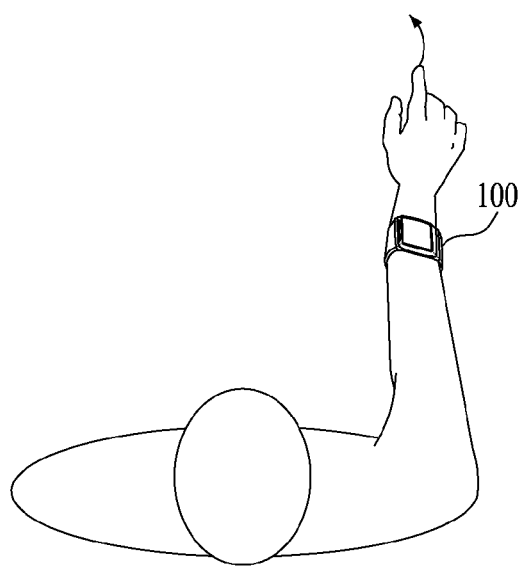
(a)

FIG. 15B
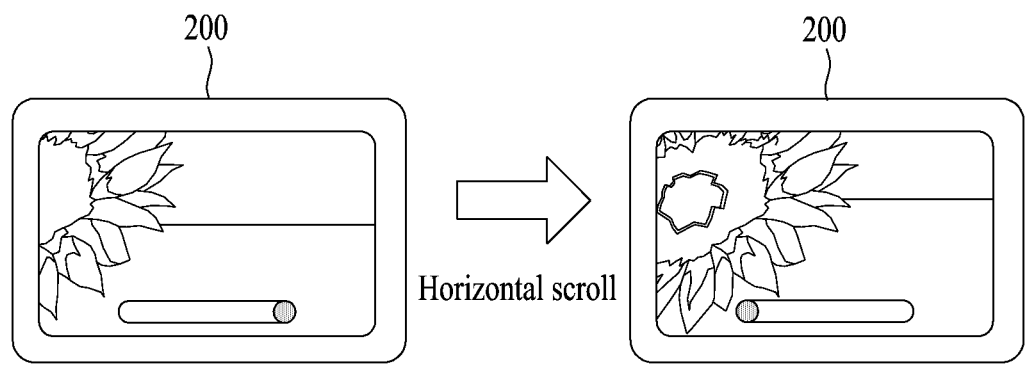
Horizontal scroll
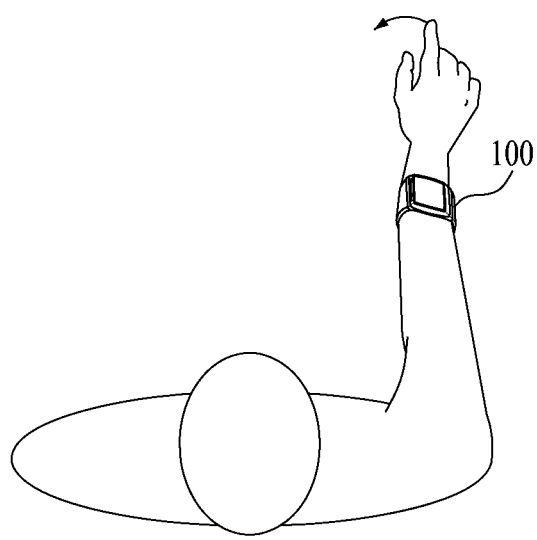
(b)

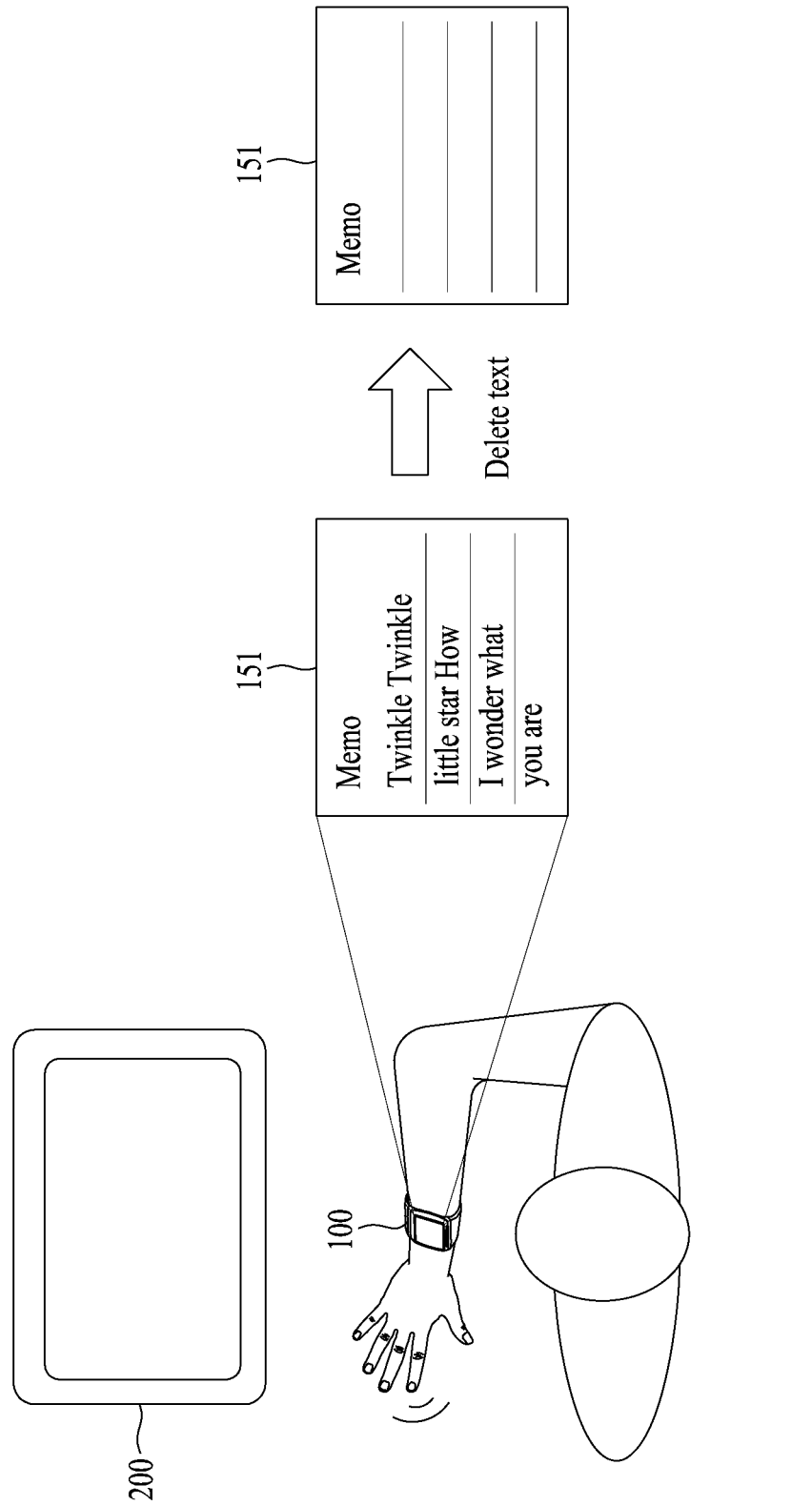

FIG. 17
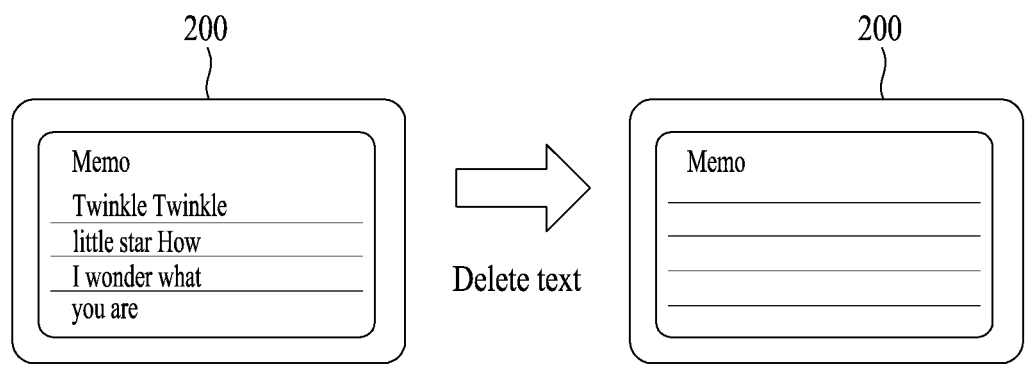
Delete text
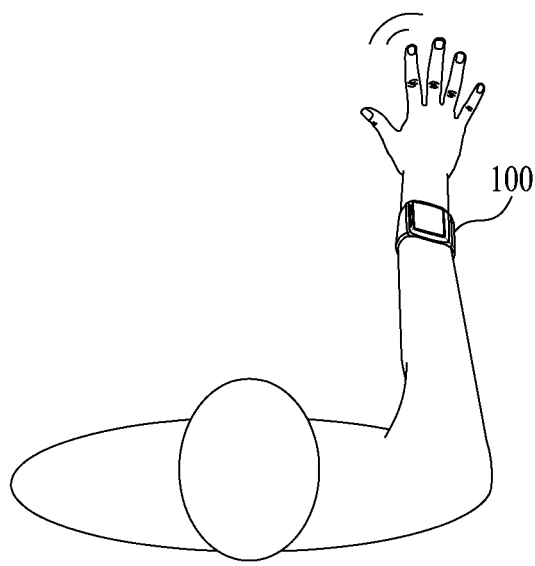

FIG. 19
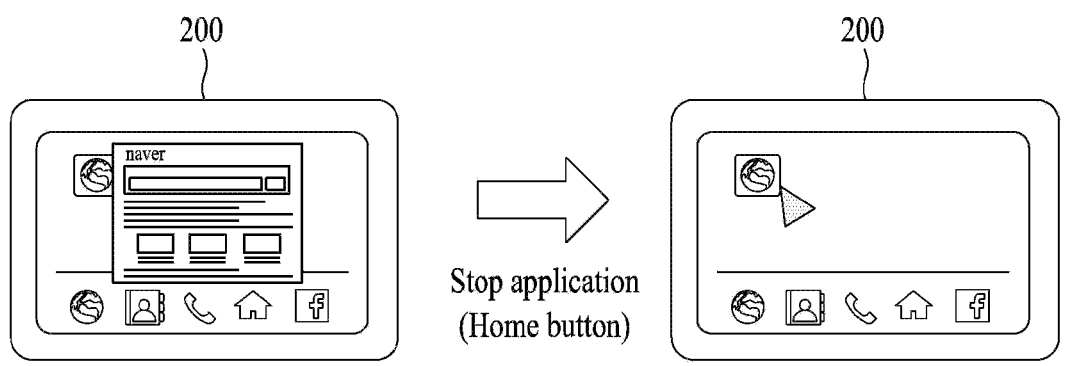
Stop application
(Home button)
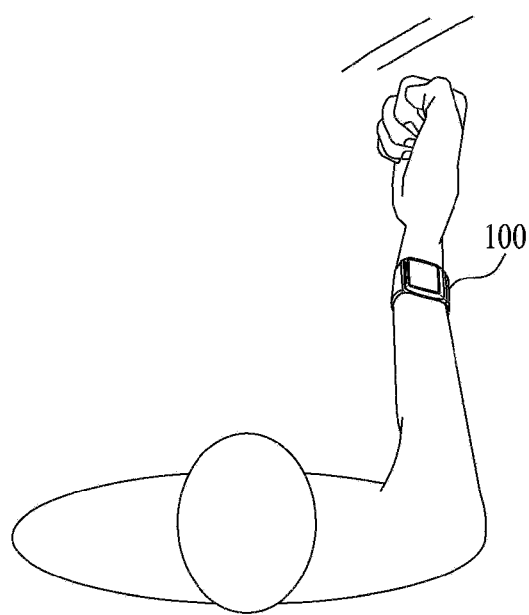

FIG. 21
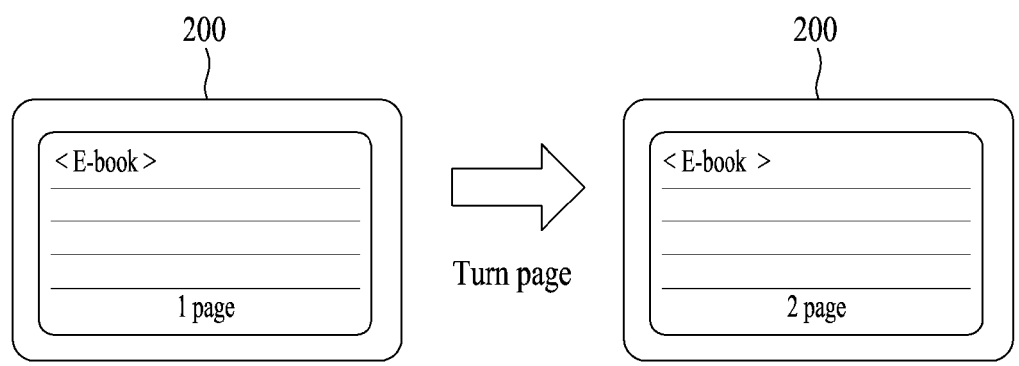
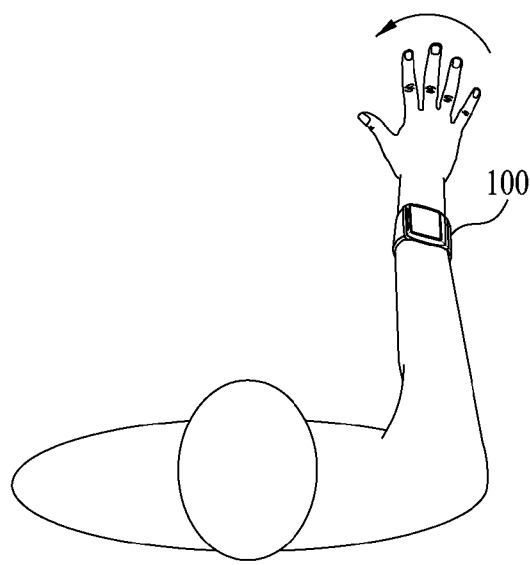

(a)          (b)

FIG. 25
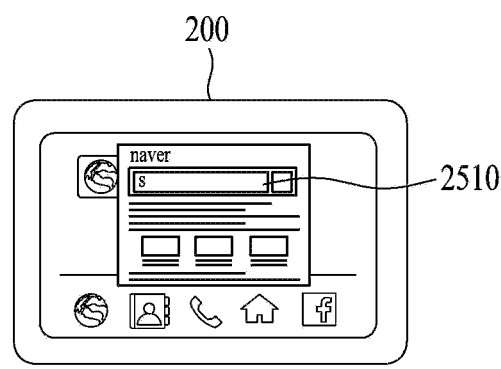

FIG. 27
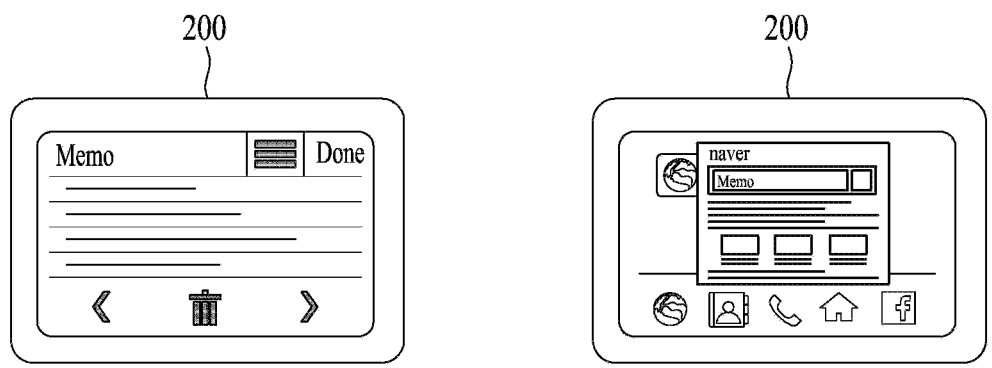
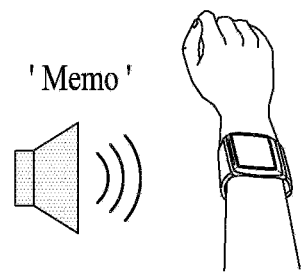
'Memo'
(a)
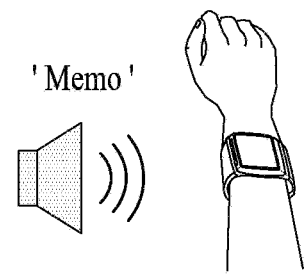
'Memo'
(b)

FIG. 32
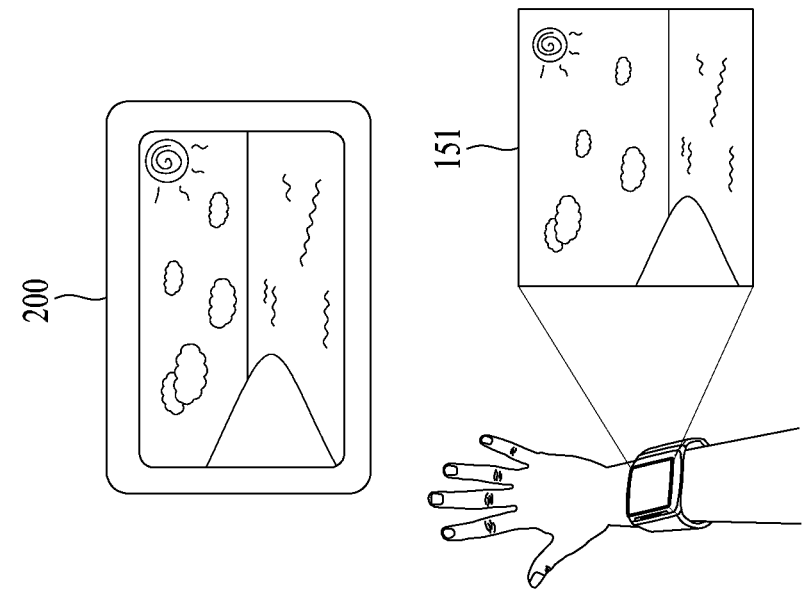
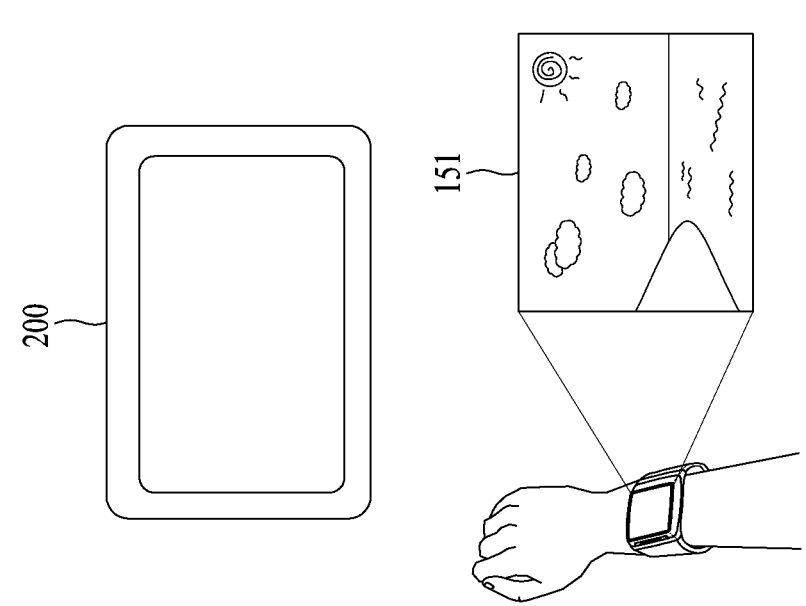

(a)   (b)

FIG. 34
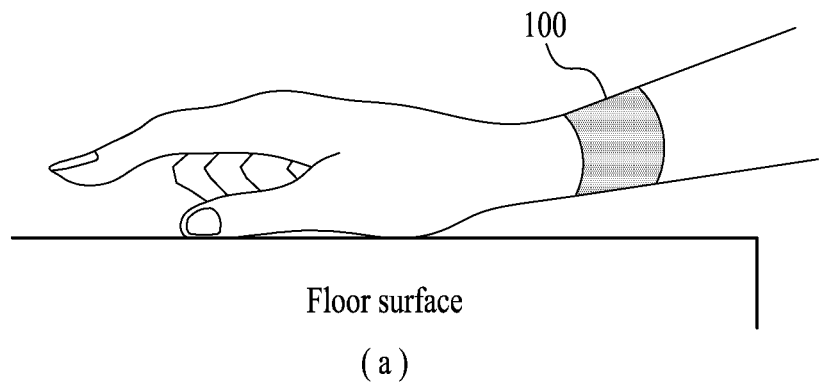
Floor surface
(a)
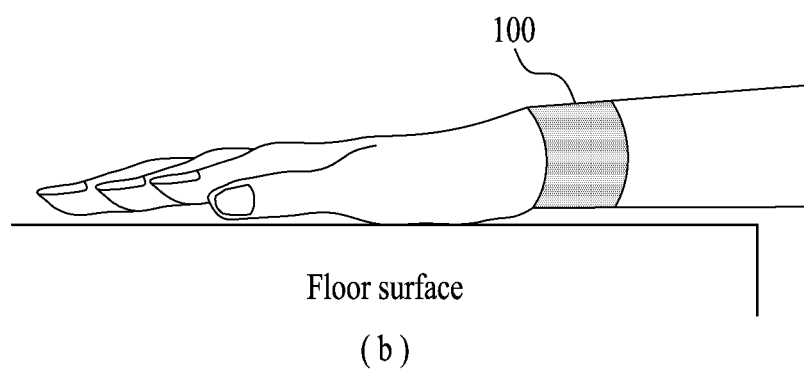
Floor surface
(b)
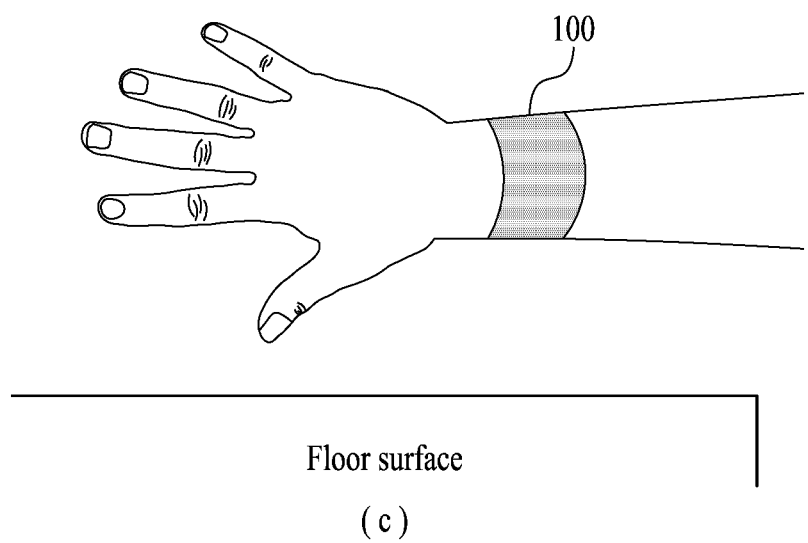
Floor surface
(c)

MOBILE TERMINAL AND CONTROLLING METHOD THEREOF

Pursuant to 35 U.S.C. §119(a), this application claims the benefit of earlier filing date and right of priority to Korean Application No. 10-2013-0103008, filed on Aug. 29, 2013, the contents of which are hereby incorporated by reference herein in its entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for remotely controlling a mobile terminal of a watch type or an external device.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Since a screen size of a mobile terminal is considerably smaller than that of a fixed device such as a TV, a PC and the like, it is difficult to observe details of a video. In order to observe details of a video, a user should apply a separate input for enlarging the video.

In order to portability or mobility of a mobile terminal, many ongoing efforts are made to research and develop a mobile terminal of a wrist-wearable type such as a wristwatch and the like.

However, since a size of a display unit of a watch type mobile terminal is very small due to its properties, it is difficult for a user to touch a screen. If a new input method for manipulating a watch type mobile terminal appropriately is developed, it may able to use the watch type mobile terminal further appropriately.

In addition, while a user wears watch type mobile terminal on a user's wrist, if a method of controlling an external device remotely based on reciprocal actions between the watch type mobile terminal and the external device is provided, it can be recognized as a significant function for providing user's convenience.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which the mobile terminal and an external device can be remotely controlled in consideration of a muscle movement in a part of a body having the mobile terminal worn thereon, a motion of the mobile terminal, sounds generated from the muscle movement and the mobile terminal motion, and the like.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal of a watch type wearable on a user's wrist according to the present invention may include a display unit configured to display information, a wireless communication unit configured to communicate with an external device as a target of a remote control, a sensing unit configured to sense a motion of the mobile terminal and a variation according to a muscle movement of a part having the mobile terminal worn thereon, and a controller creating a control command for remotely controlling either the mobile terminal and the external device based on a sensing signal of the sensing unit.

In another aspect of the present invention, as embodied and broadly described herein, a method of controlling a mobile terminal of a watch type wearable on a user's wrist according to the present invention may include the steps of sensing a motion of the mobile terminal and a variation according to a muscle movement of a part having the mobile terminal worn thereon and creating a control command for remotely controlling either the mobile terminal and the external device based on a sensing signal generated from a result of the sensing step.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 7 is a diagram for one example of a function matched to each user gesture;

FIG. 8 and FIG. 9 are diagrams for examples of releasing a mobile terminal and an external device from a power saving mode;

FIGS. 10A to 10D are diagrams for one example to describe a pointer control in a mobile terminal and an external device;

FIG. 12A and FIG. 12B are diagrams for one example to describe zoom-in/out function in a mobile terminal and an external device;

FIG. 13A and FIG. 13B are diagrams for one example to describe zoom-in/out function in a mobile terminal and an external device;

FIG. 15A and FIG. 15B are diagrams for another example to describe a scroll function in a mobile terminal and an external device;

FIG. 16 and FIG. 17 are diagrams for examples to describe a process for deleting an inputted text in a mobile terminal and an external device;

FIG. 18 and FIG. 19 are diagrams for examples to describe a process for stopping a task performed in a mobile terminal and an external device;

FIG. 20 and FIG. 21 are diagrams for examples to describe a process for enabling a page-turn function in a mobile terminal and an external device;

FIG. 24 and FIG. 25 are diagrams for examples to describe a process for inputting a text to a mobile terminal and an external device by a user's handwriting;

FIG. 26 and FIG. 27 are diagrams for examples to describe a process for remotely controlling a mobile terminal and an external device by a voice input;

FIG. 32 is a diagram for one example to describe a process for initiating a mirroring between a mobile terminal and an external device in response to an input of a gesture for the mirroring;

FIG. 34 is a diagram to describe a process for determining an operating mode of a mobile terminal through a size of a contact between a palm and a floor surface.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
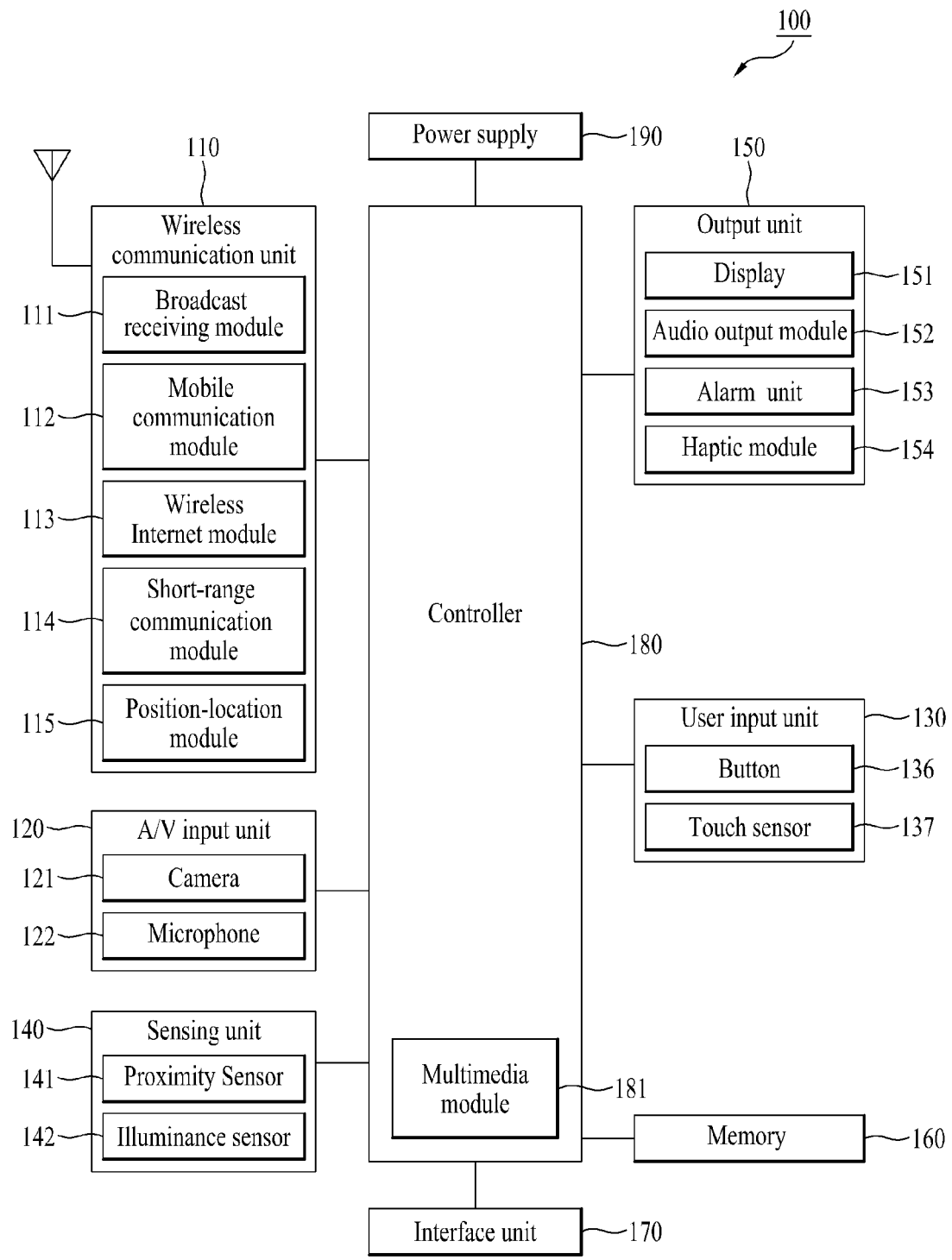
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
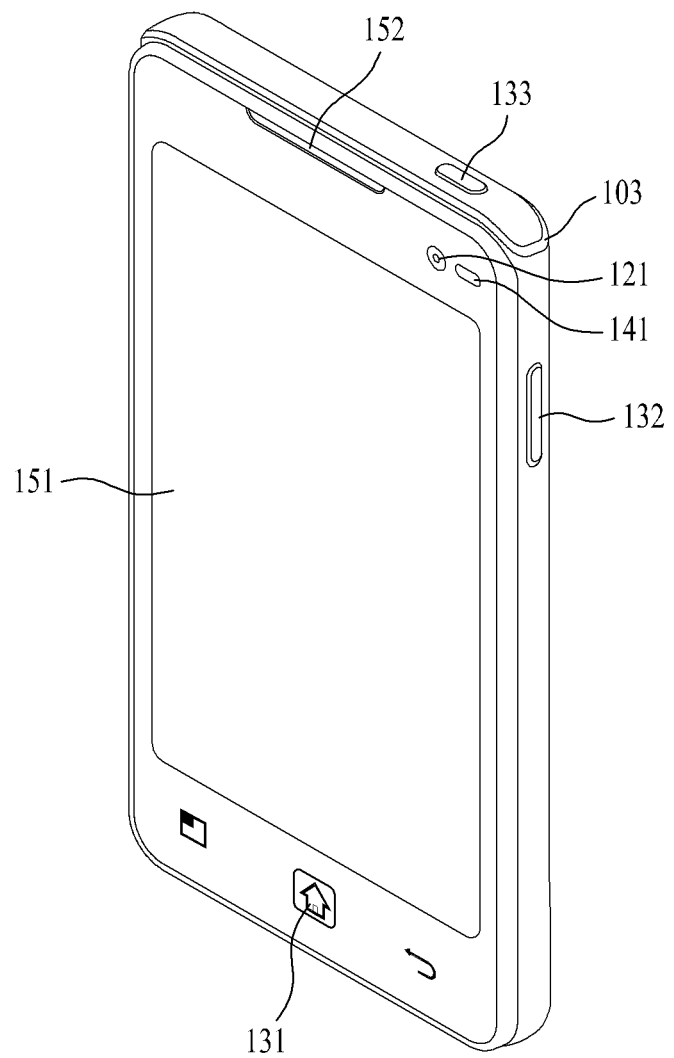
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric censor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
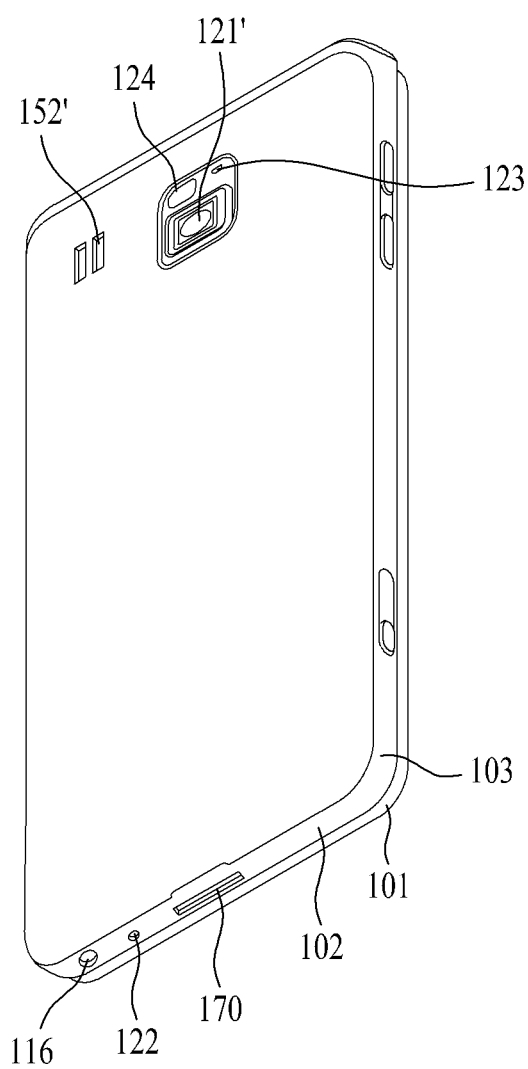
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the fowler camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
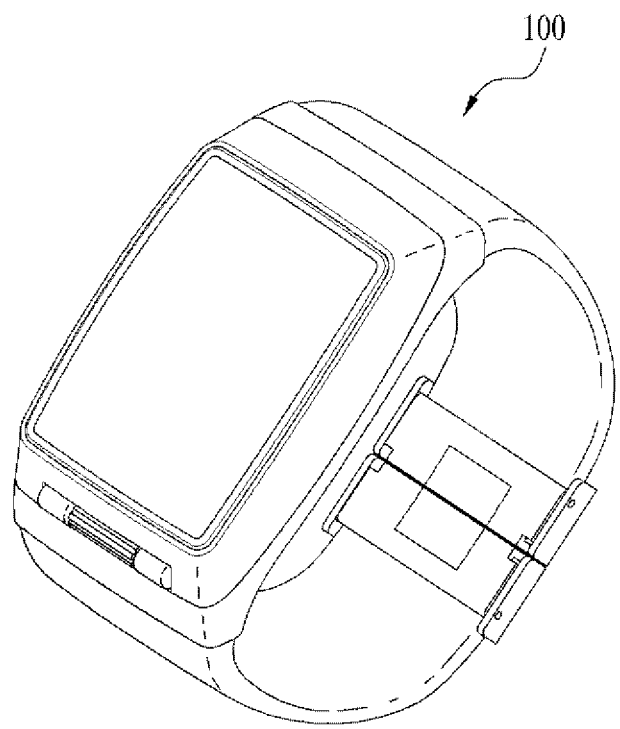
FIG. 4 is a diagram for one example of a mobile terminal of a watch type.

The mobile terminal 100 mentioned in the description of the present invention can have a wristwatch type configuration wearable on a user's wrist. For instance, FIG. 4 is a diagram for one example of a mobile terminal of a watch type. In case that the mobile terminal 100 is implemented into a watch configuration, the sensing unit 140 may be provided to an inner surface (e.g., a surface coming in contact with a user's skin, etc.) of the mobile terminal 100. The sensing unit 140 provided to the inner surface of the mobile terminal 100 can sense a variation of a muscle movement in a part (e.g., a user's wrist, etc.) on which the mobile terminal 100 is worn. In order to sense the variation of the muscle movement in the mobile terminal worn part, the sensing unit 140 can have at least one sensor. For instance, the sensing unit 140 employs a magnetic sensor for sensing a magnet varying depending on a muscle movement, a pressure sensor for sensing a pressure applied by a muscle movement, a ultrasonic sensor for sensing a muscle movement by discharging ultrasonic waves and then sensing the reflected ultrasonic waves, and the like, thereby sensing the variation of the muscle movement.

When fingers are used, each of the fingers uses different muscles. And, a muscle used in moving a single finger is different from that used in moving several fingers. Moreover, the former muscles. Moreover, a variation of the former muscle is different from that of the latter muscle as well. Hence, based on a sensing signal of the sensing unit 140 configured to detect a variation of the muscle movement, the controller 180 can determine how a specific finger of a user has moved.

Moreover, it is a matter of course that the sensing unit 140 may further include a sensor (e.g., an accelerometer sensor, a gyro sensor, etc.) capable of a motion of the mobile terminal 100 in itself. Hence, the controller 180 can detect that an arm having the mobile terminal worn thereon is moving. The sensing unit 140 may include a photosensor. In particular, the photosensor includes a light source unit and a light receiving unit. When the light source unit emits light, the light receiving unit can obtain a motion of the mobile terminal 100. In order for the light emitted from the light source unit to be reflected by a floor surface, when the mobile terminal 100 is worn on a wrist, it may be preferable that the photosensor is provided to a part of the mobile terminal 100 corresponding to an inward wrist.

The sensing unit 140 may further include a sensor configured to sense a strength of a pressure or a biorhythm (e.g., a pulsation, etc.) when a muscle is relaxed or contracted.

For clarity of the following description, assume that the mobile terminal 100 has a watch configuration that can be worn on a wrist. Moreover, the mobile terminal 100 mentioned in the following description is assumed as including at least one of the components shown in FIG. 1. In particular, the mobile terminal 100 mentioned in the following description includes the wireless communication unit 110, the microphone 122, the sensing unit 140, the display unit 151 and the controller 180 among the components shown in FIG. 1.

The display unit 151 employed by the mobile terminal 100 of the watch type may include a touchscreen or may not. In case that the display unit 151 includes the touchscreen, it can be used as an output device for outputting information as well as an input device for receiving a touch input from a user. For clarity of the descriptions of the following embodiments, assume that the display unit 151 may include the touchscreen.

According to the present invention, the mobile terminal 100 is configured to remotely control itself or an external device 200 based on a motion of an arm having the mobile terminal 100 worn thereon or a muscle movement of a part having the mobile terminal 100 worn thereon. In this case, various kinds of electronic device capable of performing wireless communications with the mobile terminal 100 may be placed under the category of the external device 200. For instance, the external device 200 may include a fixed electronic device such as a personal computer (PC), a television, an air conditioner, a washer and the like or such a mobile electronic device such as a smartphone, a PDA, a PDP, an MP3, a laptop, a tablet PC and the like.

Based on the above-mentioned assumptions, operations of the mobile terminal 100 according to the present invention shall be described in detail as follows.

Figure 5:
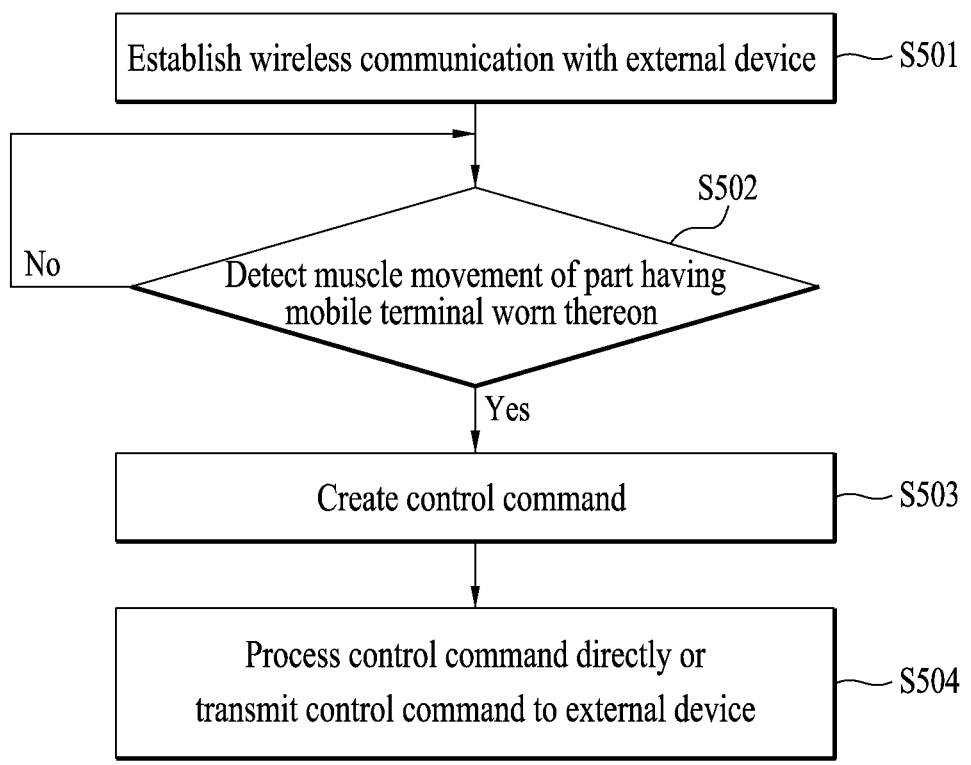
FIG. 5 is a flowchart for an operation of a mobile terminal according to one embodiment of the present invention.

FIG. 5 is a flowchart for an operation of a mobile terminal according to one embodiment of the present invention.

Referring to FIG. 5, a wireless communication can be established between the mobile terminal 100 and the external device 200 [S501]. In particular, the mobile terminal 100 and the external device 200 can be connected to each other in direct. Alternatively, the mobile terminal 100 and the external device 200 can be indirectly connected to each other via a relay device (e.g., AP (access point)). Moreover, such a wireless communication technology as Bluetooth, Zigbee, Wifi Direct, Wifi and the like can be applied between the mobile terminal 100 and the external device 200.

Generally, in order to establish a wireless communication between the mobile terminal 100 and the external device 200, a reception of an appropriate user input may be required. For instance, in order for the mobile terminal 100 to be paired with the external device 200 using Bluetooth wireless technology, the mobile terminal 100 may need to receive a user input for activating a Bluetooth module, a user input for selecting the external device 200 from a device list of devices capable of being paired with the mobile terminal 100 by Bluetooth, and a user input of inputting an access password for the pairing. In order to settle the inconvenience that a user has to apply an appropriate user input one by one in establishing a wireless communication between the mobile terminal 100 and the external device 200, the mobile terminal 100 acquires authentication information required for the wireless communication establishment from the external device 200 using such a non-contact short-range wireless communication technology as NFC, RFID and the like and is then able to establish the wireless communication with the external device 200 automatically based on the acquired authentication information.

For instance, if a name of the external device 200 and an access password for the pairing are included in the authentication information received from the external device 200 using such a non-contact short-range wireless communication technology as NFC, RFID and the like, the mobile terminal 100 requests an access through the name of the external device indicated by the authentication information. When the access password is requested, the mobile terminal 100 automatically inputs the access password indicated by the authentication information so that the wireless communication with the external device 200 can be automatically established.

In particular, if a user just puts the mobile terminal 100 to approach the NFC or RFID of the external device 200, the wireless communication between the mobile terminal 100 and the external device 200 can be established.

After the wireless communication between the mobile terminal 100 and the external device 200 has been established, if the sensing unit 140 detects a variation of a motion of an arm having the mobile terminal 100 worn thereon or a variation of a muscle movement of a part having the mobile terminal 100 worn thereon [S502], the controller 180 can create a control command for controlling the mobile terminal 100 or the external device 200 based on at least one of a sensing signal of the sensing unit 140 and a sound inputted through the microphone 122 [S503]. In doing so, the controller 180 can create the control command in consideration of a user's gesture (e.g., a motion of the arm or hand having the mobile terminal 100 worn thereon). In creating the control command, the controller 180 may further consider a sound generated from a movement of a finger through the microphone 122. In particular, when the control command is created, the sound inputted through the microphone 122 is further considered as well as the sensing signal of the sensing unit 140, whereby the control command appropriate for user's intention can be created.

If the created control command is provided for the mobile terminal 100, the controller 180 can process the control command by itself [S504]. On the other hand, if the created command is provided for the external device 200, the controller 180 can control the wireless communication unit 110 to transmit the created control command to the external device 200 [S504].

The controller 180 can determine a subject for processing the control command depending on a setting value saved in the memory 160. The setting value saved in the memory 160 can indicate one of a self-control mode and a remote control mode. In the self-control mode, the controller 180 can process the control command by itself. In the remote control mode, the controller 180 can control the control command to be transmitted to the external device 200 in order for the external device 200 to process the control command. In general, the setting value is changed manually by a user. Yet, the setting value may be automatically adjusted depending on a current situation of the mobile terminal 100. For instance, the controller 180 can automatically adjust the setting value based on a location of an arm having the mobile terminal 100 worn thereon.

Figure 6:
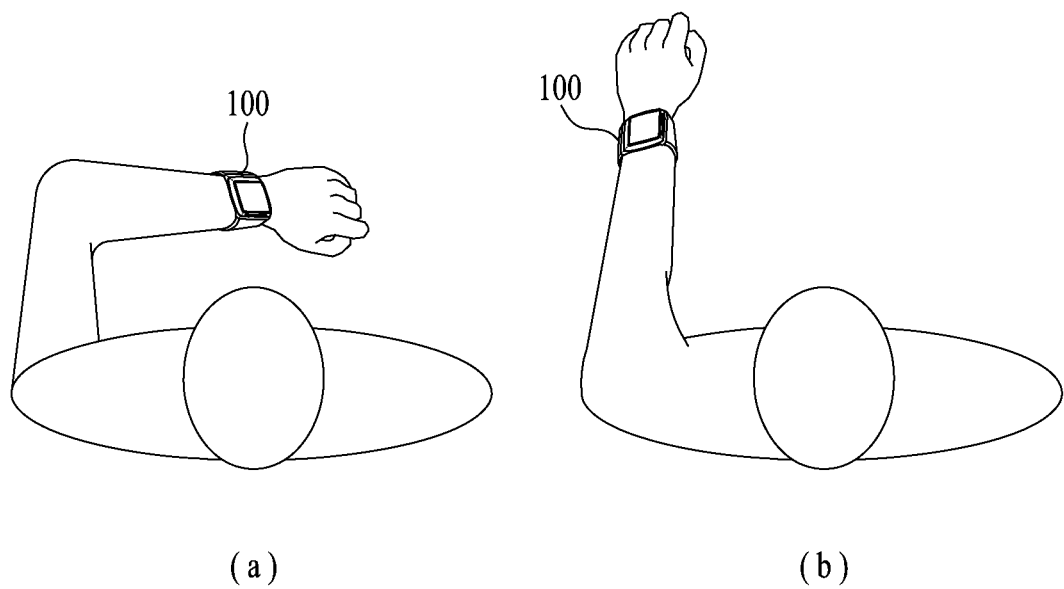
FIG. 6 is a diagram for one example to describe a process for automatically adjusting a setting value depending on a location of an arm on which a mobile terminal is worn.

FIG. 6 is a diagram for one example to describe a process for automatically adjusting a setting value depending on a location of an arm on which a mobile terminal is worn.

Referring to FIG. 6 (a), if an arm having the mobile terminal 100 worn thereon is determined as bent inward, the setting value may indicate the self-control mode. Hence, when the arm having the mobile terminal 100 worn thereon is bent inward, a user gesture may be determined as provided to remotely control not the external device 200 but the mobile terminal 100.

On the other hand, referring to FIG. 6 (b), if an arm having the mobile terminal 100 worn thereon is determined as stretched forward, the setting value may indicate the remote control mode. Hence, when the arm having the mobile terminal 100 worn thereon is stretched forward, a user gesture may be determined as provided to remotely control not the mobile terminal 100 but the external device 200.

The controller 180 can create various control commands to remotely control an operation of one of the mobile terminal 100 and the external device 200 per user's gesture.

For instance, FIG. 7 is a chart for one example of a function matched to each user gesture.

Referring to FIG. 7, the controller 180 can create a control command for such a function as a power saving mode adjustment, a pointer control, a screen zoom-in/out, a handwritten input, a page turn, a scroll and the like per user's gesture. In the memory 160, a mapping table of mapping a control command per user's gesture can be saved. And, the controller 180 can page an appropriate control command in response to a user's gesture using the mapping table. Operations of the mobile terminal 100 and the external device 200 per user gesture shown in FIG. 7 shall be described in detail with reference to the accompanying drawings as follows.

Figure 8:
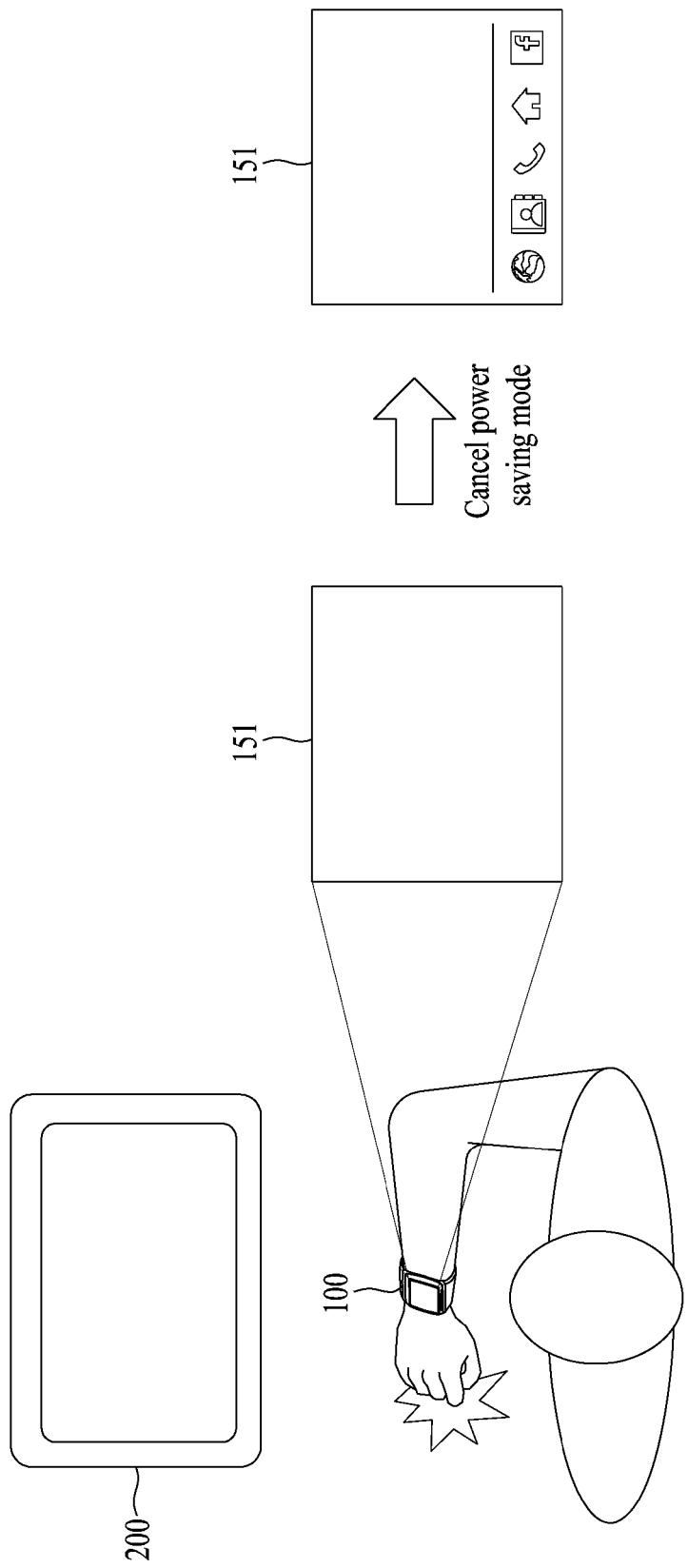

FIG. 8 and FIG. 9 are diagrams for examples of releasing a mobile terminal and an external device from a power saving mode.

Referring to FIG. 8 and FIG. 9, a mode of each of the mobile terminal 100 and the external device 200 can be set to a power saving mode for efficient power consumption. In the power saving mode, although a power of the external device 200 is turned on, the display unit 151 may be turned off to minimize the power consumption.

While a processing subject of a control command is set to the mobile terminal 100, if a gesture for cancelling the power saving mode is detected, referring to FIG. 8, the controller 180 can control the power saving mode of the mobile terminal 100 to be cancelled.

On the contrary, while a processing subject of a control command is set to the external device 200, if a gesture for cancelling the power saving mode is detected, referring to FIG. 9, the controller 180 transmits a control command related to a power saving mode cancellation to the external device 200 so that the external device 200 can be released from the power saving mode.

Like the examples shown in FIG. 7, if the gesture for cancelling the power saving mode is an action of knocking a floor surface with folded fingers, the controller 180 can recognize that the gesture for cancelling the power saving mode has been inputted in consideration of a muscle movement on folding the fingers, a vertical movement of the mobile terminal 100 due to knocking the floor surface, a sound generated from knocking the floor surface, and/or the like. In doing so, it may be unnecessary to consider all of the enumerated factors.

FIGS. 10A to 10D are diagrams for one example to describe a pointer control in the mobile terminal 100 and the external device 200.

FIGS. 11A to 11D are diagrams for one example to describe a pointer control in the mobile terminal 100 and the external device 200.

First of all, a pointer for enhancing the facilitation of user's manipulations can be displayed on each of the mobile terminal 100 and the external device 200. While a processing subject of a control command is set to the mobile terminal 100, if a gesture for moving the pointer is detected, referring to FIG. 10A, the controller 180 can adjust a location of the pointer outputted through the display unit 151.

Figure 11A:
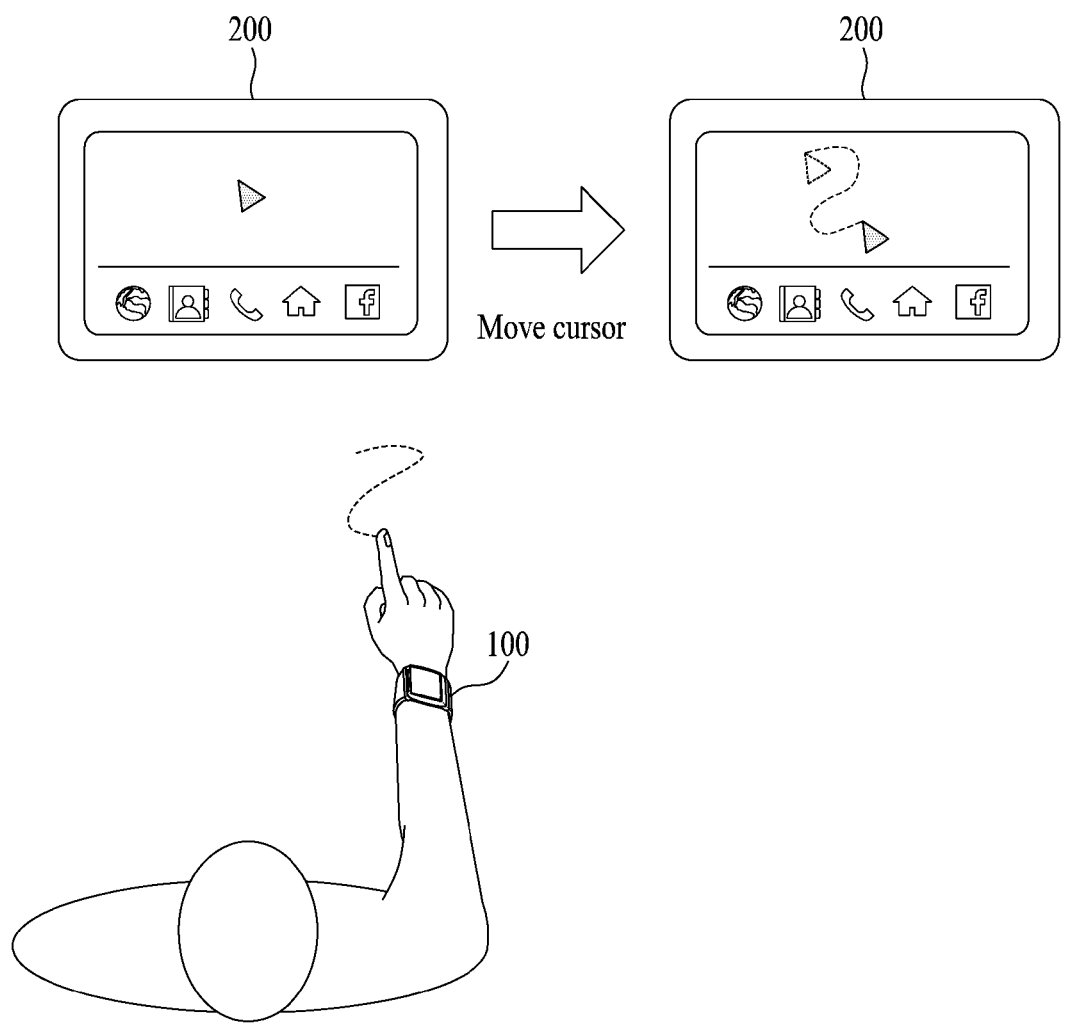
FIGS. 11A to 11D are diagrams for one example to describe a pointer control in a mobile terminal and an external device.

On the other hand, while a processing subject of a control command is set to the external device 200, if a gesture for moving the pointer is detected, referring to FIG. 11A, the controller 180 transmits a control command for moving the pointer to the external device 200 to control the pointer to move in the external device.

If the gesture for moving the pointer is an action of moving a finger, like the example shown in FIG. 10A or FIG. 11A, the controller 180 may control the pointer to move along a trace of a movement of the finger.

Like the example shown in FIG. 7, if the gesture for moving the pointer includes the action of moving a specific finger (e.g., a forefinger, etc.), the controller 180 can recognize that the gesture for moving the pointer has been inputted in consideration of a muscle movement on moving the specific finger, a sound generated from scratching a floor surface with the specific finger, and/or the like. In doing so, it may be unnecessary to consider all of the enumerated factors.

Unlike the example shown in FIG. 7, the gesture for moving the pointer may include an action of moving an arm having the mobile terminal 100 worn thereon. If the gesture for moving the pointer is the action of moving the arm having the mobile terminal 100 worn thereon, the controller 180 may be able to move the pointer along a motion of the mobile terminal 100 in itself. In doing so, the controller 180 may be able to obtain the motion of the mobile terminal 100 by the aforementioned sensing signal of the sensing unit 140.

While a processing subject of a control command is set to the mobile terminal 100, if a gesture for selecting a point indicated by a pointer is detected [e.g., a gesture corresponding to a left click of a mouse, etc.], referring to FIG. 10B, the controller 180 can control the point, which is indicated by the pointer outputted through the display unit 151, to be selected. In the example shown in FIG. 10B, an internet icon indicated by the pointer is selected and a web browser is then activated.

Figure 11B:
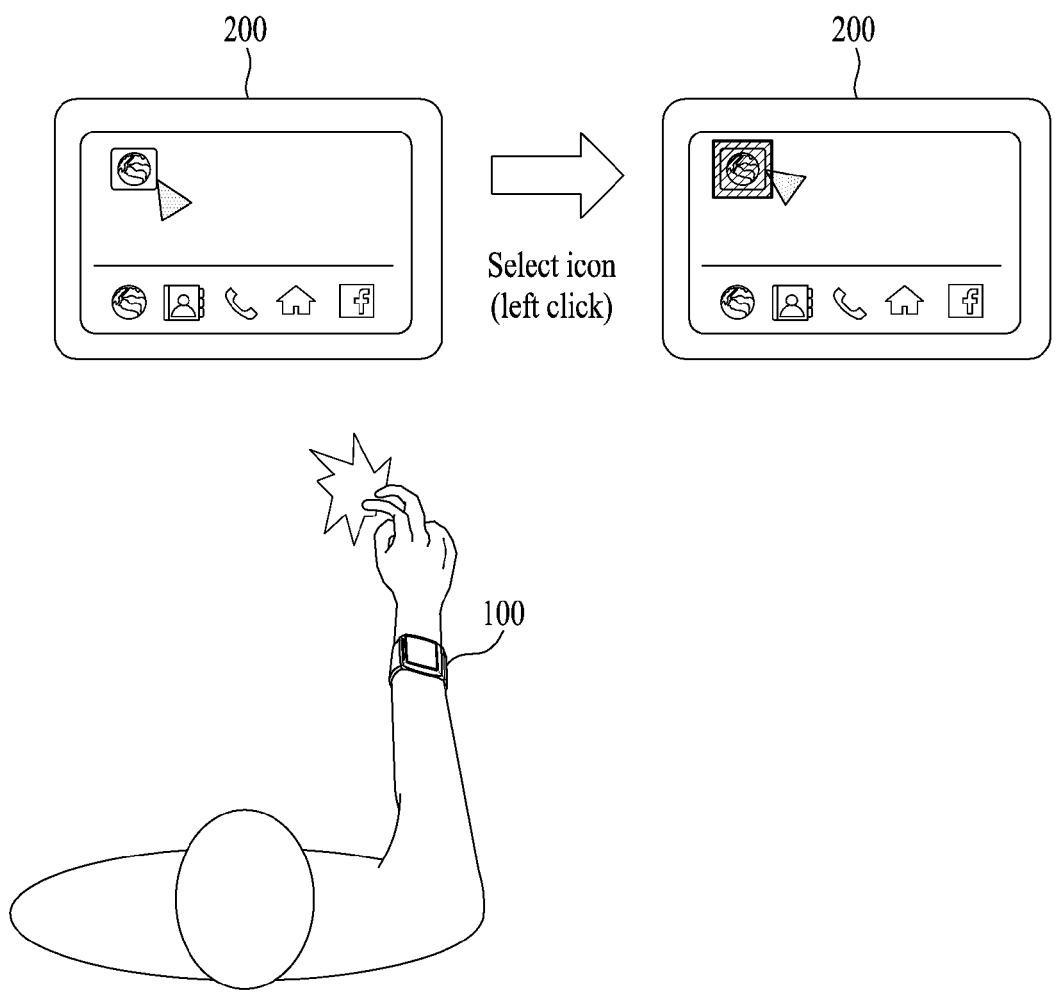

On the other hand, while a processing subject of a control command is set to the external device 200, if a gesture for selecting a point indicated by a pointer is detected, referring to FIG. 11B, the controller 180 may be able to control the point, which is indicated by the pointer outputted through the display unit 151, to be selected by transmitting a control command for selecting the point indicated by the pointer to the external device 200. In the example shown in FIG. 11B, an internet icon indicated by the pointer is selected and the selected internet icon is identifiably displayed.

In the examples shown in FIG. 10B and FIG. 11B, an icon is selected by a user's gesture. In such a mobile OS environment such as iOS, Android, Windows 8, Symbian, Tigen and the like, a prescribed icon can be activated by being selected (or clicked) once. On the other hand, in a desktop OS environment such as Windows Vista, Windows XP, Windows 7 and the like, a prescribed icon can be activated by being selected twice (or double clicked) consecutively. Hence, when a pointer indicates a prescribed icon, like the example shown in FIG. 10B, in the mobile environment, an icon indicated by a pointer can be activated by inputting a user's gesture once. On the contrary, in the desktop environment, an icon indicated by a pointer can be activated by inputting a user's gesture twice consecutively.

Although FIG. 10B and FIG. 11B show the example that an icon is selected by a user's gesture, an object selected by a user is non-limited by an icon. If a pointer displayed on the mobile terminal 100 or the external device 200 indicates a text or a drawing, the controller 180 may control the text or drawing indicated by the pointer to be selected.

Figure 10C:
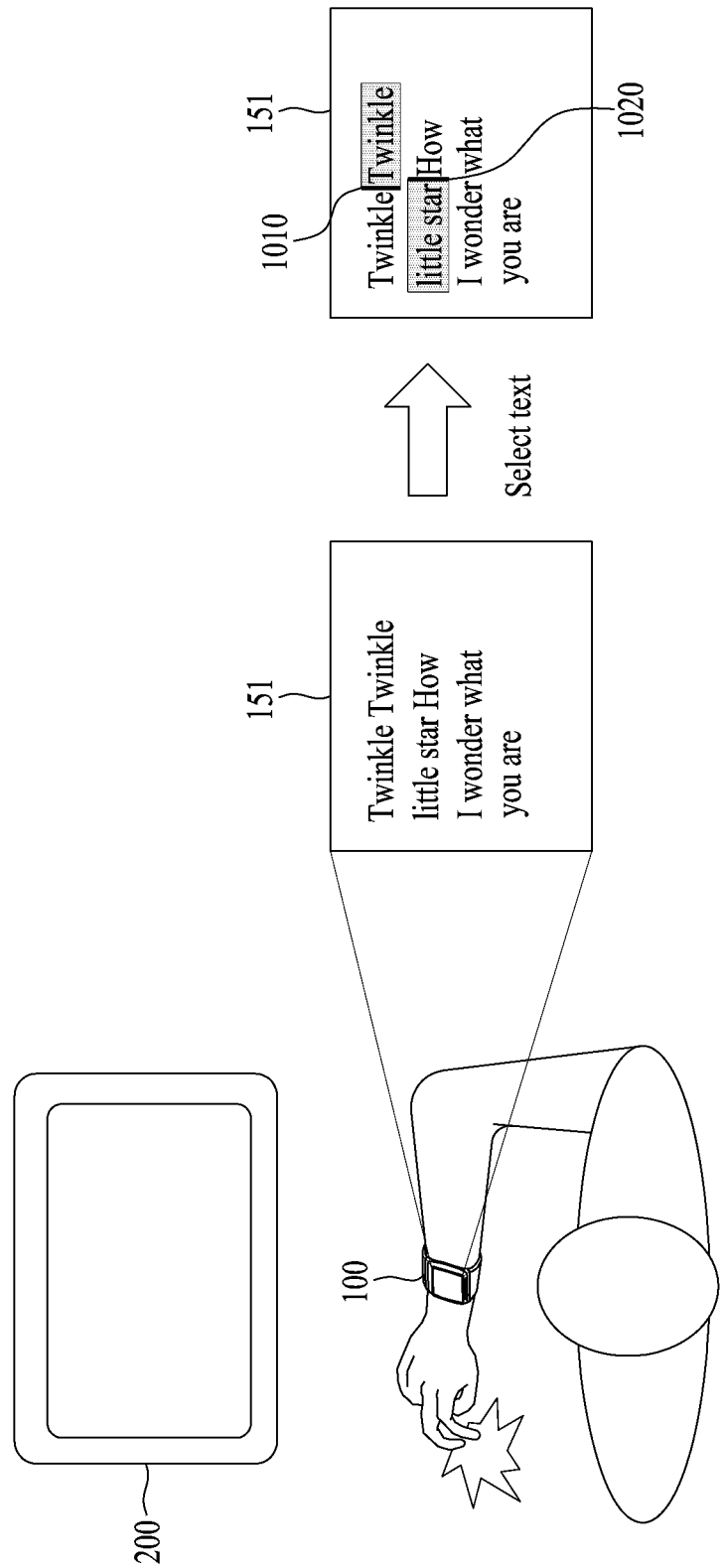
Figure 11C:
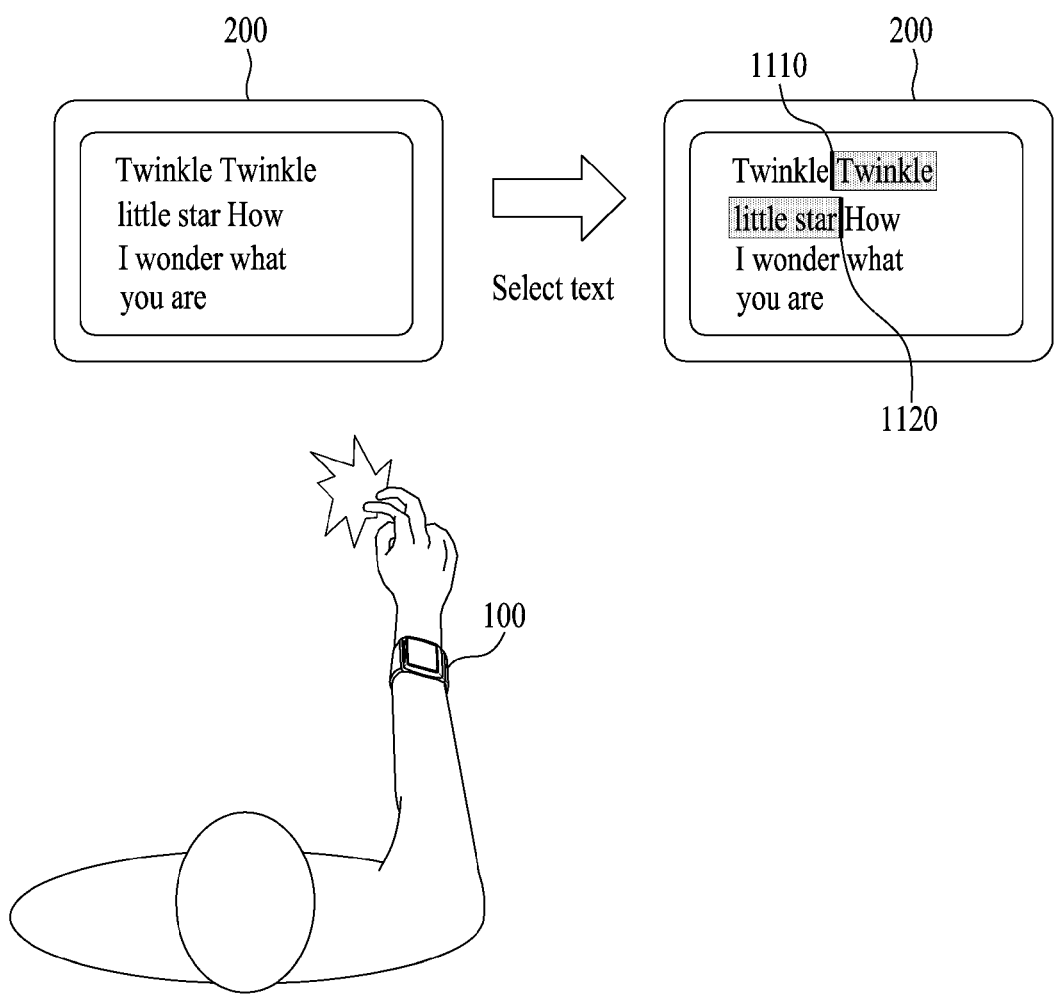

For instance, FIG. 10C and FIG. 11C are diagrams for example of selecting a text by a user's gesture. While a processing subject of a control command is set to the mobile terminal 100, if a gesture for selecting a text indicated by a pointer is inputted, referring to FIG. 10C, the controller 180 can control the text indicated by the pointer to be selected.

On the other hand, while a processing subject of a control command is set to the external device 200, if a gesture for selecting a text indicated by a pointer is inputted, referring to FIG. 11C, the controller 180 can control the text indicated by the pointer to be selected by transmitting a control command for selecting the text indicated by the pointer to the external device 200.

If a text is selected, an indicator for identifying a start point of the selected text and an indicator for identifying an end point of the selected text can be displayed on the mobile terminal 100 or the external device 200. In doing so, if a gesture for selecting a part indicated by a pointer includes an action of tapping a floor surface with two fingers (e.g., a forefinger and a middle finger, etc.), as shown in FIG. 7, a location of one of the two fingers may correspond to a location of the indicator of the start point and a location of the other may correspond to a location of the indicator of the end point. For instance, referring to FIG. 11C, if a location of the forefinger and a location of the middle finger correspond to the location of the indicator of the start point and the location of the indicator of the end point, respectively, the locations of the indicators of the start and end points can be changed by changing the locations of the forefinger and the middle finger. Thus, by adjusting the location of the forefinger and the location of the middle finger, it is able to adjust a range of a selection of the text.

Like the example shown in FIG. 7, if a gesture for selecting a point indicated by a pointer includes an action of tapping a floor surface with two fingers, the controller 180 can recognize that the gesture for selecting the point indicated by the pointer has been selected in consideration of a detection of a muscle movement on stretching the two fingers, a sound generated from tapping the floor surface with two fingers, and/or the like. In doing so, it may be unnecessary to consider all of the enumerated factors.

The controller 180 may receive an input of a gesture (e.g., a gesture corresponding to a right click of a mouse, etc.) for displaying a menu from a user. In such an environment (e.g., iOS, Android, Symbian, Tigen, etc.) to which a function corresponding to the right click of the mouse is not assigned, the gesture for displaying the menu may be handled as an action of long pressing the point indicated by the pointer.

Figure 10D:
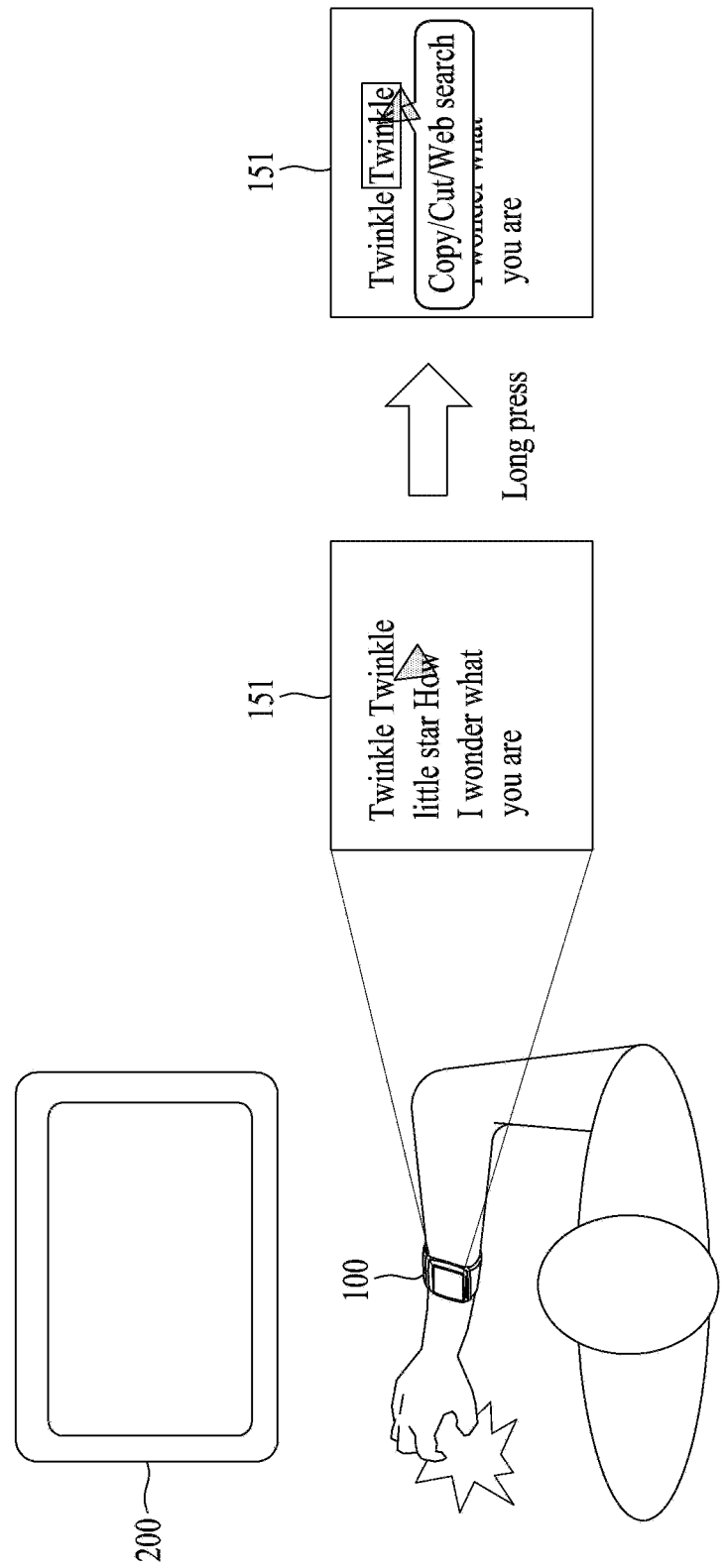
Figure 11D:
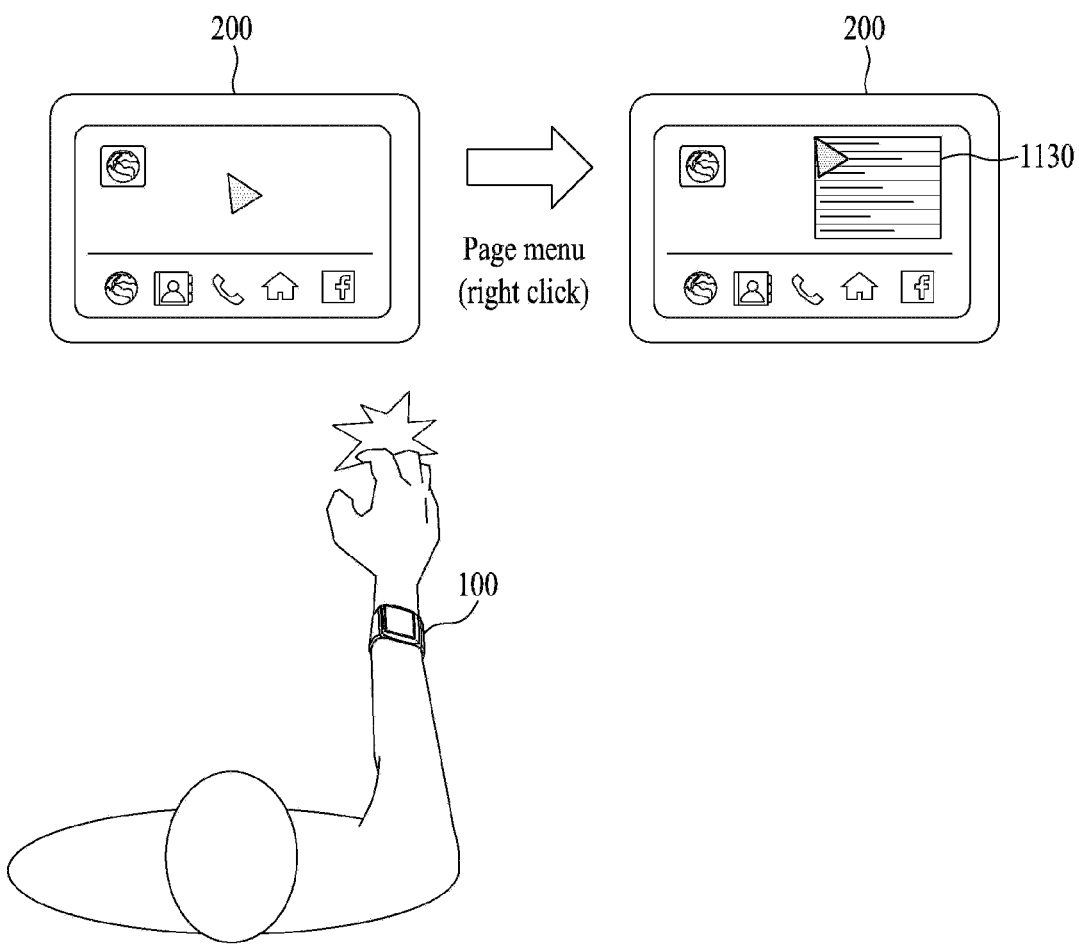

Hence, in response to a user's gesture, referring to FIG. 10D and FIG. 11D, the controller 180 can handle the point indicated by the pointer as long pressed or can control the menu to be displayed at the point indicated by the pointer. In the example shown in FIG. 10D, in response to the user gesture, the text at the point indicated by the pointer is selected and a menu 1030 for selecting an additional function, which is to be performed on the selected text, is then displayed. In the example shown in FIG. 11D, in response to the user gesture, a menu 1140 of functions executable on a background screen (or a home screen) is displayed.

Like the example shown in FIG. 7, if the gesture for displaying the menu includes an action of tapping a floor surface with at least 4 fingers, the controller 180 may be able to recognize that the gesture for displaying the menu has been inputted in consideration of a detection of a muscle movement on stretching the at least 4 fingers, a sound generated from tapping a floor surface with 4 fingers, and/or the like. In doing so, it may be unnecessary to consider all of the enumerated factors.

In the example shown in FIG. 7, a gesture for selecting a point indicated by a pointer (i.e., a gesture corresponding to a left click of a mouse) includes an action of tapping a floor surface with 2 fingers, while a gesture for displaying a menu (i.e., a gesture corresponding to a right click of a mouse) includes an action of tapping a floor surface with 4 fingers. Unlike the example shown in FIG. 7, in order to provide a user experience similar to using a mouse actually, a gesture for selecting a point indicated by a pointer may be set to an action of tapping a floor surface with a forefinger (i.e., an action of moving a forefinger up and down) and a gesture for displaying a menu may be set to an action of tapping a floor surface with a middle finger (i.e., an action of moving a middle finger up and down). In this case, the controller 180 may be able to recognize that the gesture for selecting the point indicated by the pointer or the gesture for paging the menu has been inputted in consideration of a muscle movement according to a motion of the forefinger or the middle finger and a sound generated from tapping the floor surface with the forefinger or the middle finger, and/or the like. In doing so, it may be unnecessary to consider all of the enumerated factors.

After a user has hit a floor surface with a finger and then holds the finger as it is for a while, if the user moves the finger along with the floor surface, the controller 180 can control a drag input to be applied along a trace of the moving finger. For another instance, other gestures can be used for the drag input. For example, if a user moves a second finger (e.g., a forefinger) on a floor surface while fixing a first finger (e.g., a thumb) to the floor surface, the controller 180 may control a drag input to be applied along a motion of the second finger.

In case that a gesture corresponding to a left click of a mouse or a gesture corresponding to a right click of the mouse is inputted, the controller 180 can control a feedback, which is provided to notify that the corresponding gesture is inputted without errors, to be outputted. In this case, the feedback can be outputted as at least one of a sound (e.g., a click sound) and a vibration.

Figure 12B:
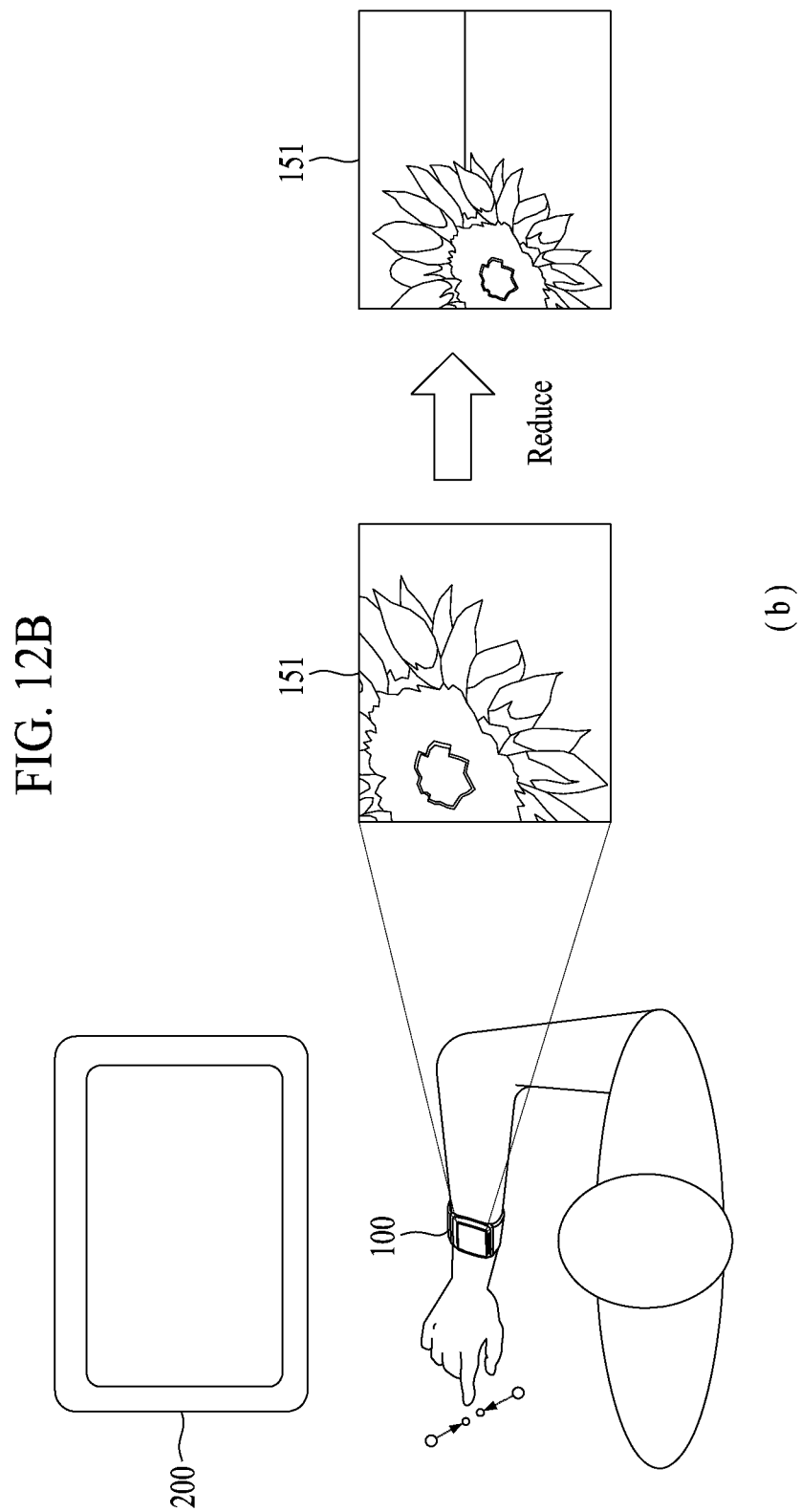

FIG. 12A and FIG. 12B are diagrams for one example to describe zoom-in/out function in the mobile terminal 100 and the external device 200. And, FIG. 12A and FIG. 12B are diagrams for one example to describe zoom-in/out function in the mobile terminal 100 and the external device 200.

First of all, while a processing subject of a control command is set to the mobile terminal 100, if a gesture for enlarging or reducing a screen is inputted, referring to FIG. 12A and FIG. 12B, the controller 180 can control an output of the display unit 151 to be enlarged or reduced.

Figure 13B:
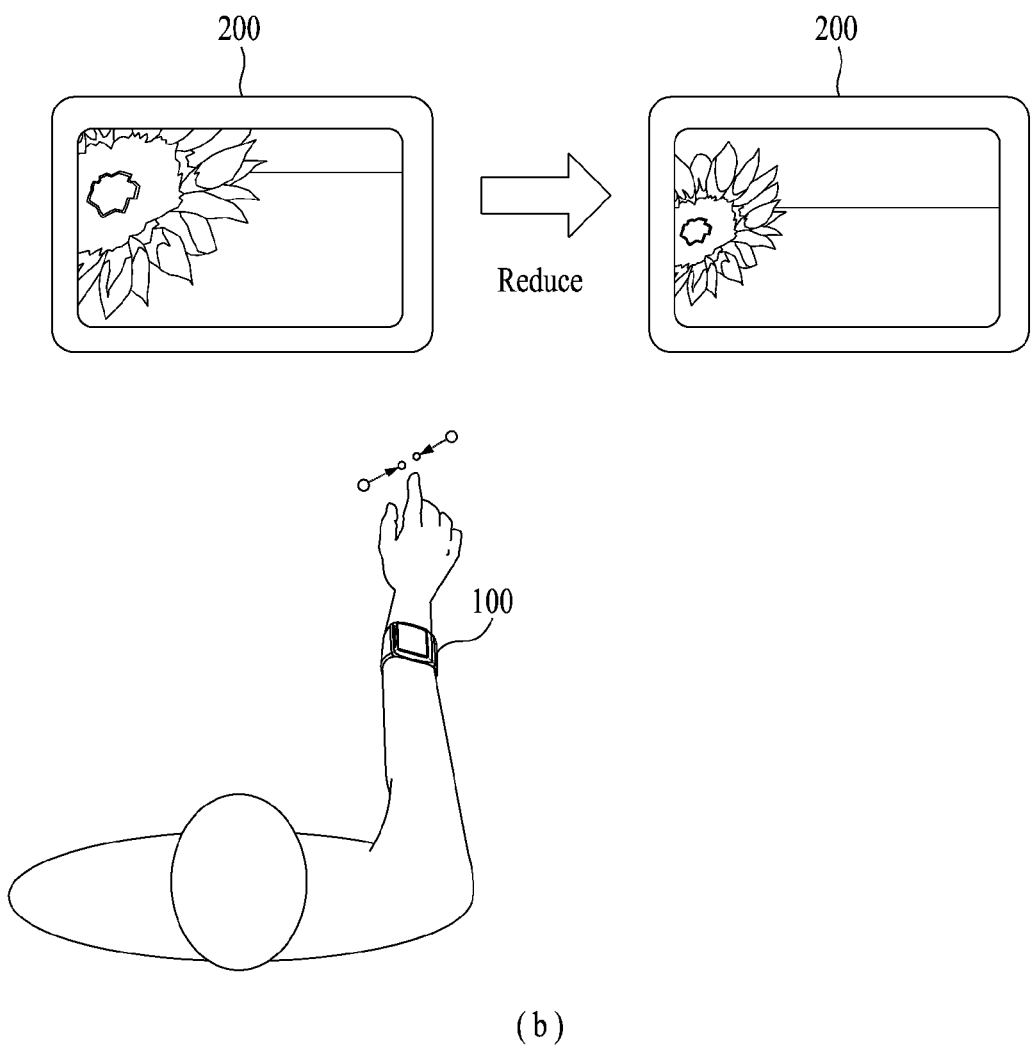

On the other hand, while a processing subject of a control command is set to the external device 200, if a gesture for enlarging or reducing a screen is inputted, referring to FIG. 13A and FIG. 13B, the controller 180 can transmit a control command for enlarging or reducing an output of the external device 200 to the external device 200.

Like the example shown in FIG. 7, if the gesture for enlarging the screen includes an action performed in a manner of touching a floor surface with 2 fingers and then increasing a distance between the 2 fingers and the gesture for reducing the screen includes an action performed in a manner of touching a floor surface with 2 fingers and then decreasing a distance between the 2 fingers, the controller 180 may be able to recognize that the gesture for enlarging or reducing the screen has been inputted in consideration of a muscle movement according to a motion of the 2 fingers, a sound generated from scratching the floor surface with the 2 fingers, and/or the like. In doing so, it may be unnecessary to consider all of the enumerated factors.

Figure 14A:
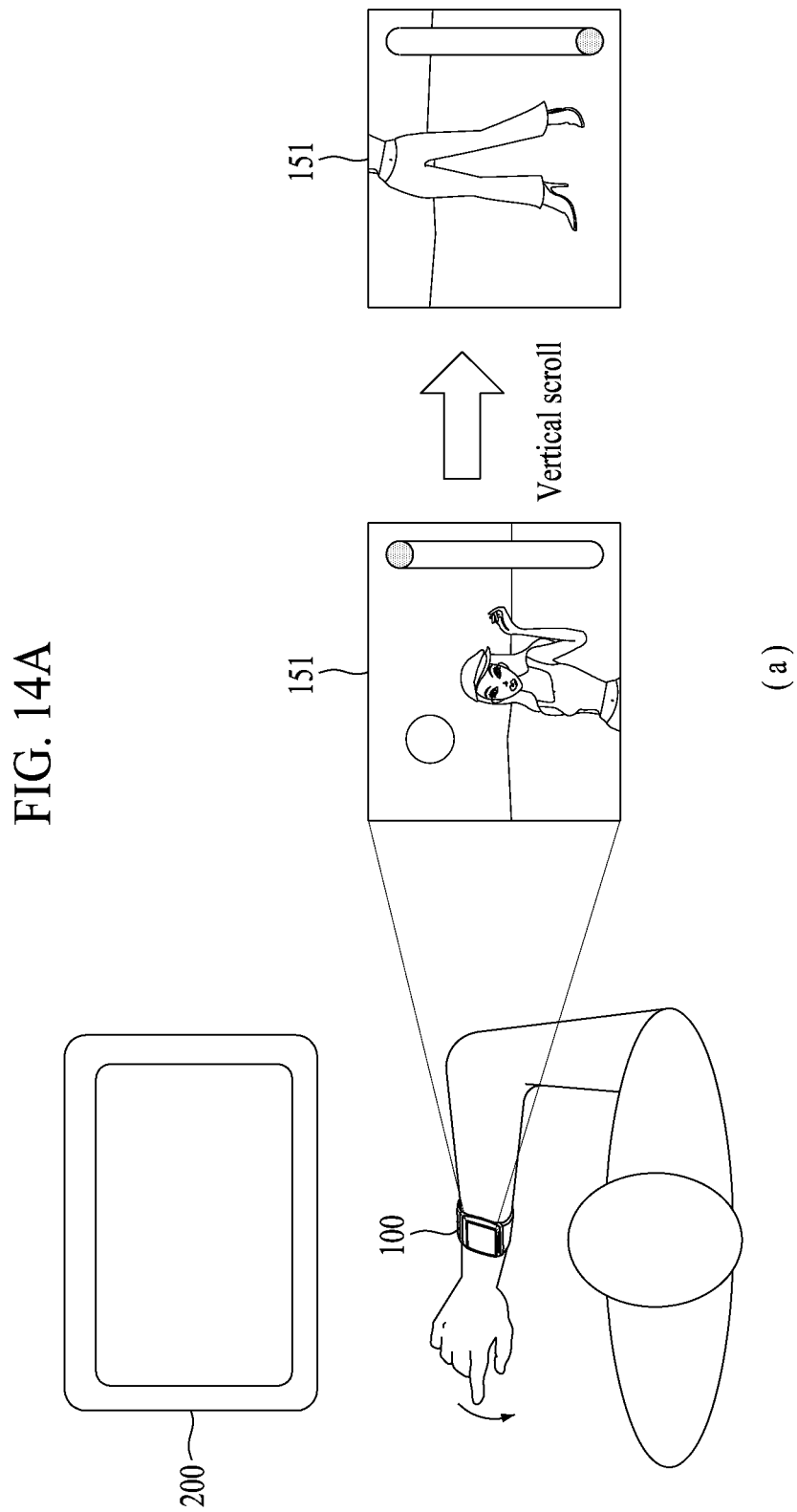
FIG. 14A and FIG. 14B are diagrams for one example to describe a scroll function in a mobile terminal and an external device.
Figure 14B:
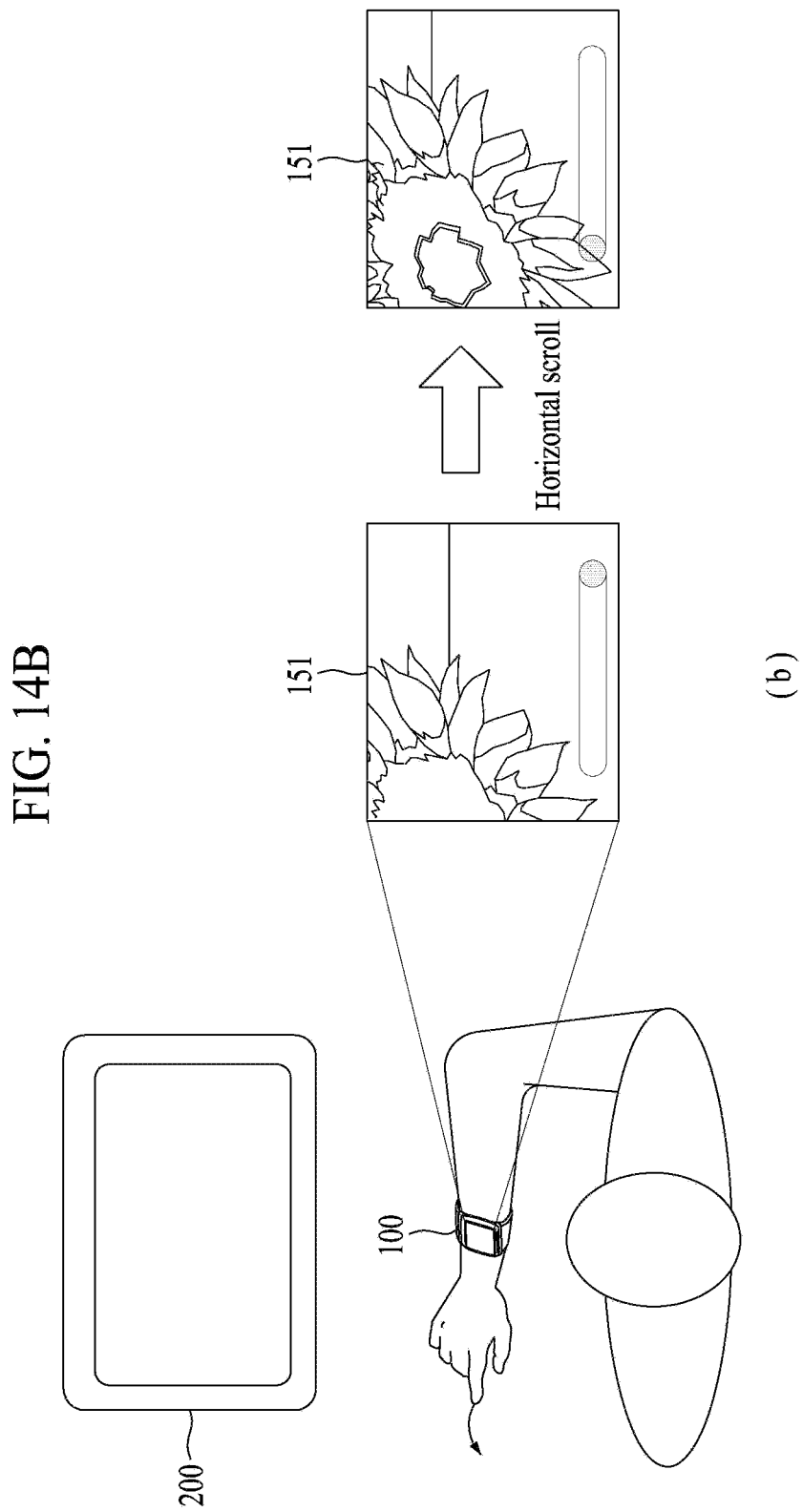

FIG. 14A and FIG. 14B are diagrams for one example to describe a scroll function in the mobile terminal 100 and the external device 200. FIG. 15A and FIG. 15B are diagrams for another example to describe a scroll function in the mobile terminal 100 and the external device 200.

First of all, while a processing subject of a control command is set to the mobile terminal 100, if a gesture for scrolling a screen horizontally or vertically is inputted, referring to FIG. 14A and FIG. 14B, the controller 180 can control the display unit 151 to be scrolled horizontally or vertically.

On the other hand, while a processing subject of a control command is set to the external device 200, if a gesture for scrolling a screen horizontally or vertically is inputted, referring to FIG. 15A and FIG. 15B, the controller 180 can transmit a control command to enable the external device to be scrolled horizontally or vertically.

Like the example shown in FIG. 7, while a prescribed finger is stretched, if an action of moving the prescribed finger horizontally is a gesture for a horizontal scroll and an action of moving the prescribed finger vertically is a gesture for a vertical scroll, the controller 180 may be able to recognize that the gesture for the horizontal or vertical scroll has been inputted in consideration of a muscle movement on stretching the finger, a muscle movement according to a motion of the finger, a sound generated from scratching the floor surface with the finger, and/or the like. In doing so, it may be unnecessary to consider all of the enumerated factors.

FIG. 16 and FIG. 17 are diagrams for examples to describe a process for deleting an inputted text in the mobile terminal 100 and the external device 200.

First of all, while a processing subject of a control command is set to the mobile terminal 100, if a gesture for deleting a text inputted to the mobile terminal 100 is inputted, referring to FIG. 16, the controller 180 can control the inputted text to be deleted.

On the contrary, while a processing subject of a control command is set to the external device 200, if a gesture for deleting a text inputted to the external device 200 is inputted, referring to FIG. 17, the controller 180 can control the text inputted to the external device 200 to be deleted by transmitting a control command for deleting the text inputted to the external device 200.

Like the example shown in FIG. 7, while fingers are stretched all, if an action of rubbing a floor with a palm is a gesture for deleting a text, the controller 180 may be able to recognize that the gesture for deleting the text has been inputted in consideration of a muscle movement in case of stretching all fingers, a sound generated from rubbing a floor surface with a palm, and/or the like. In doing so, it may be unnecessary to consider all of the enumerated factors.

Figure 18:
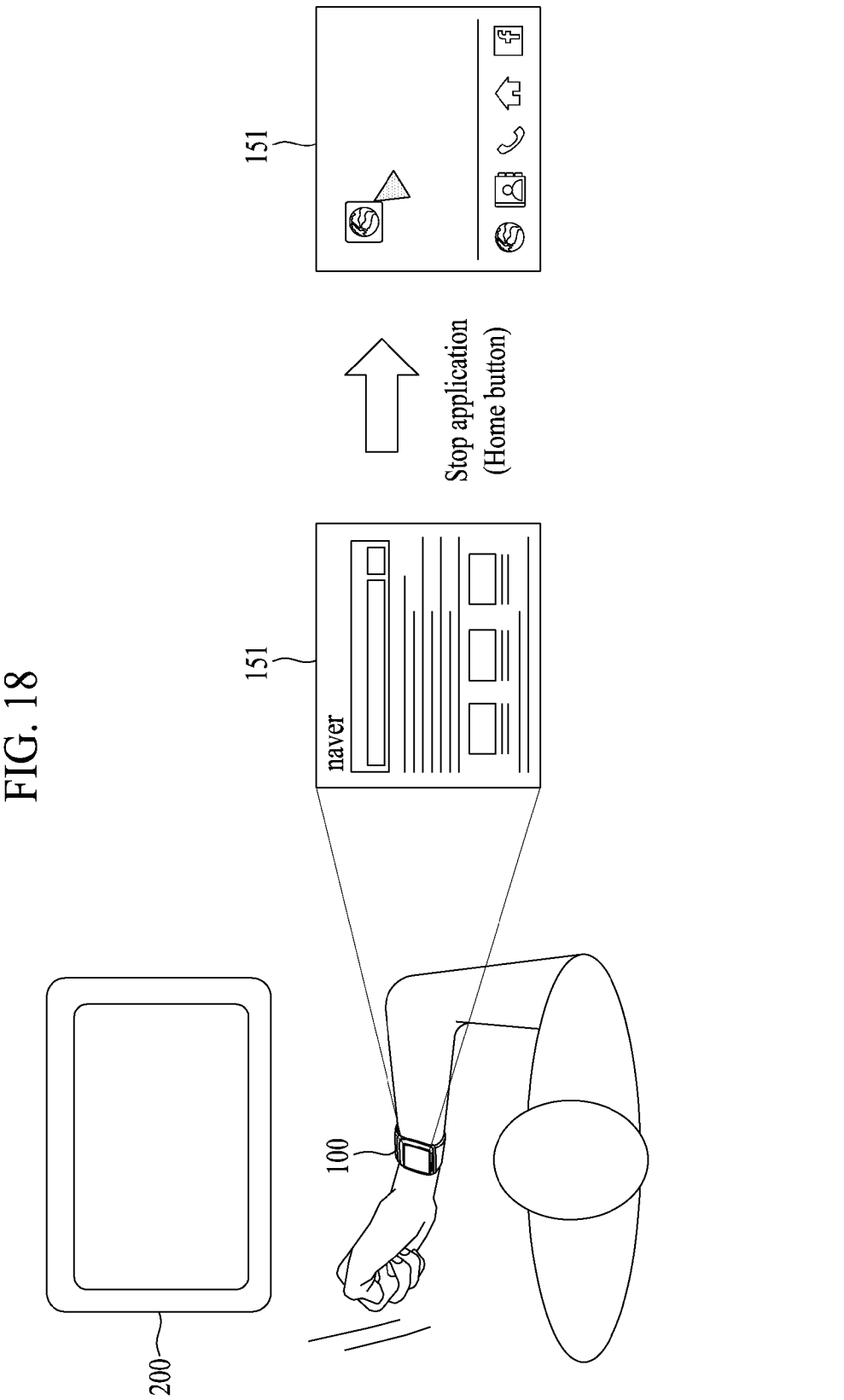

FIG. 18 and FIG. 19 are diagrams for examples to describe a process for stopping a task performed in the mobile terminal 100 and the external device 200.

First of all, while a processing subject of a control command is set to the mobile terminal 100, if a gesture for stopping a task activated in the mobile terminal 100 is inputted, referring to FIG. 18, the controller 180 can control the activated task to be stopped. For instance, while an application program is running in the mobile terminal 100, if a user gesture is inputted, the controller 180 can control the application program to be stopped by ending the application program or switching a state of the application program to a background state. Thus, the gesture for stopping the task activated in the mobile terminal 100 can be set to have the same effect as pressing a home button in a mobile OS environment such as iOS, Android, Windows 8, Symbian, Tigen and the like.

On the contrary, while a processing subject of a control command is set to the external device 200, if a gesture for stopping a task activated in the external device 200 is inputted, referring to FIG. 19, the controller 180 can control the task activated in the external device 200 to be stopped by transmitting a control command for stopping the task activated in the external device 200.

Like the example shown in FIG. 7, if an action of hitting a floor surface with a fist is a gesture for stopping a task, the controller 180 may be able to recognize that the gesture for stopping the task has been inputted in consideration of a muscle movement in case of folding all fingers, a sound generated from hitting a floor surface with a fist, and/or the like. In doing so, it may be unnecessary to consider all of the enumerated factors.

Figure 20:
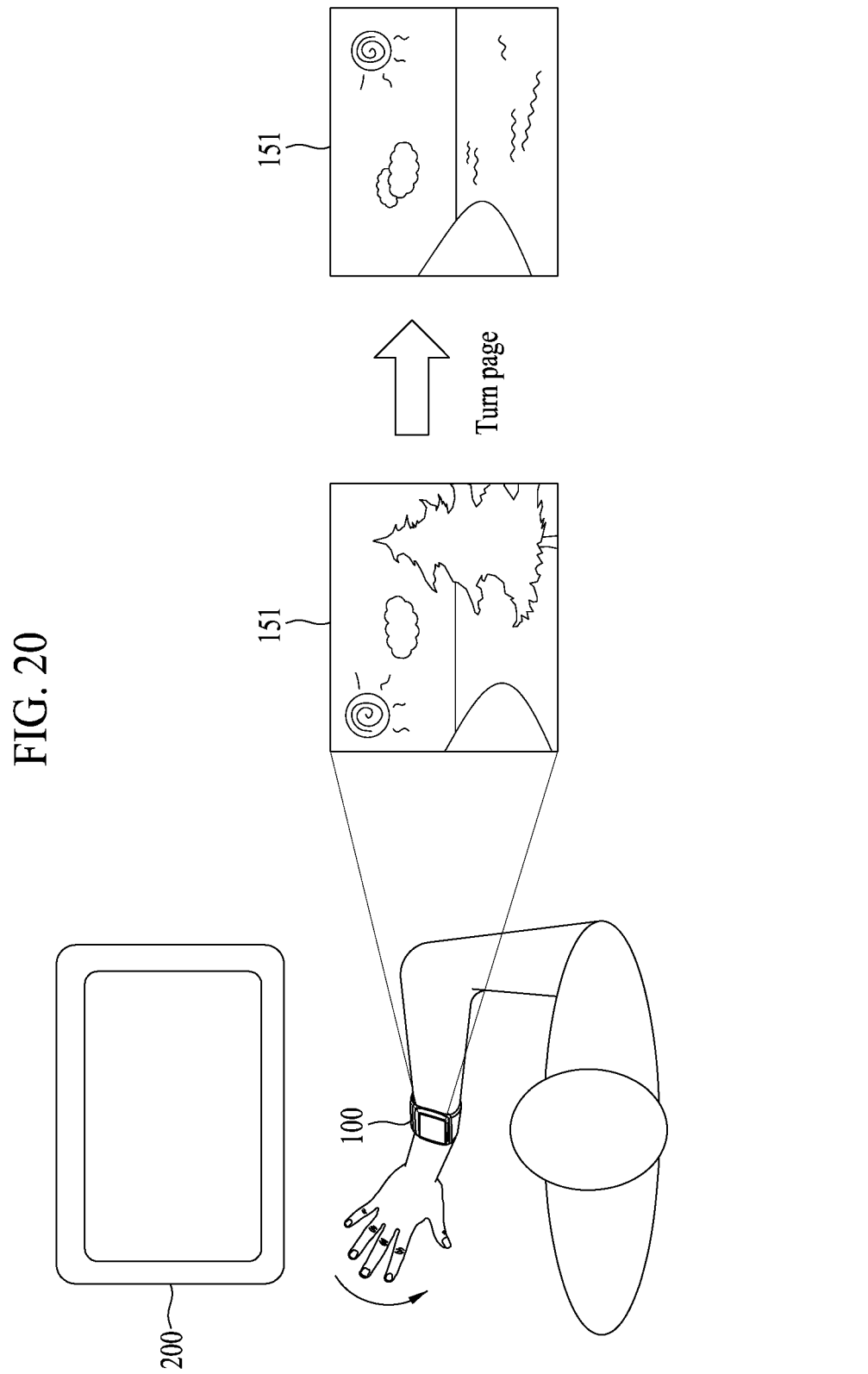

FIG. 20 and FIG. 21 are diagrams for examples to describe a process for enabling a page-turn function in the mobile terminal 100 and the external device 200.

First of all, while a processing subject of a control command is set to the mobile terminal 100, if a gesture for turning a page is inputted, the controller 180 can control a page turning action to be performed in the mobile terminal 100. For instance, referring to FIG. 20, while a photo is displayed through the mobile terminal 100, if a gesture for turning a page is inputted, the controller 180 can control a next photo (or a previous photo) to be displayed in response to the gesture input. For another instance, while such a content configured by a page unit as an e-book, a document and the like is displayed through the mobile terminal 100, if a gesture for turning a page is inputted, the controller 180 can control a next photo (or a previous photo) to be displayed in response to the gesture input. For further instance, while a TV broadcast is displayed through the mobile terminal 100, if a gesture for turning a page is inputted, the controller 180 can control a next channel (or a previous channel) to be tuned in to in response to the gesture input.

On the contrary, while a processing subject of a control command is set to the external device 200, if a gesture for turning a page is inputted, the controller 180 can control a page turning operation to be performed in the external device 200 by transmitting a control command for turning a page to the external device 200. In the example shown in FIG. 21, a page of an e-book content is turned or changed in response to a gesture input.

Like the example shown in FIG. 7, if an action of waving (i.e., hovering) a hand in the air with stretched fingers is a gesture for turning a page, the controller 180 may be able to recognize that the gesture for turning a page has been inputted in consideration of a muscle movement in case of stretching all fingers, a motion of the mobile terminal 100 sound generated from waving the hand in the air, and/or the like. In doing so, the controller 180 may be able to control a unit of the page turning to vary in consideration of a waved extent (e.g., a horizontal movement width, a waved speed, etc.) of the mobile terminal 100. For instance, if the waved extent of the mobile terminal 100 is weak (e.g., if the horizontal movement width of the mobile terminal 100 is equal to or smaller than a preset value, if the waved speed of the mobile terminal 100 is equal to or smaller than a preset value, etc.), the controller 180 controls the page turning to be performed by a unit of 1 page (or 1 content). For another instance, if the waved extent of the mobile terminal 100 is strong (e.g., if the horizontal movement width of the mobile terminal 100 is greater than a preset value, if the waved speed of the mobile terminal 100 is greater than a preset value, etc.), the controller 180 controls the page turning to be performed by a unit of plural pages (or plural contents).

Like the examples shown in FIGS. 7 to 21, if a user's gesture is inputted, the controller 180 can create a control command for activating (or enabling) a function matched to the inputted gesture. The mapping relation between the gesture and the function shown in FIG. 7 is exemplarily provided for the convenience of the description, by which the present invention may be non-limited. A gesture different from the example shown in FIG. 7 may be mapped to a prescribed function. And, it is able to use the mobile terminal 100 by mapping the gesture shown in FIG. 7 to a function different from that shown in FIG. 7.

Based on the above descriptions, various embodiments implemented through the mobile terminal 100 according to the present invention shall be described in detail as follows.

<Triggering of Handwritten Input Mode/Voice in Put Mode>

First of all, in order to input a text to the mobile terminal or the external device 200, a mode of the controller 180 can be set to a handwritten input mode or a voice input mode. In particular, if a user gesture for initiating a handwritten input mode or a voice input mode is inputted or a text needs to be inputted through the mobile terminal or the external device 200, the controller 180 can enter the handwritten input mode and/or the voice input mode. This is described in detail with reference to FIG. 22 and FIG. 23 as follows.

Figure 22:
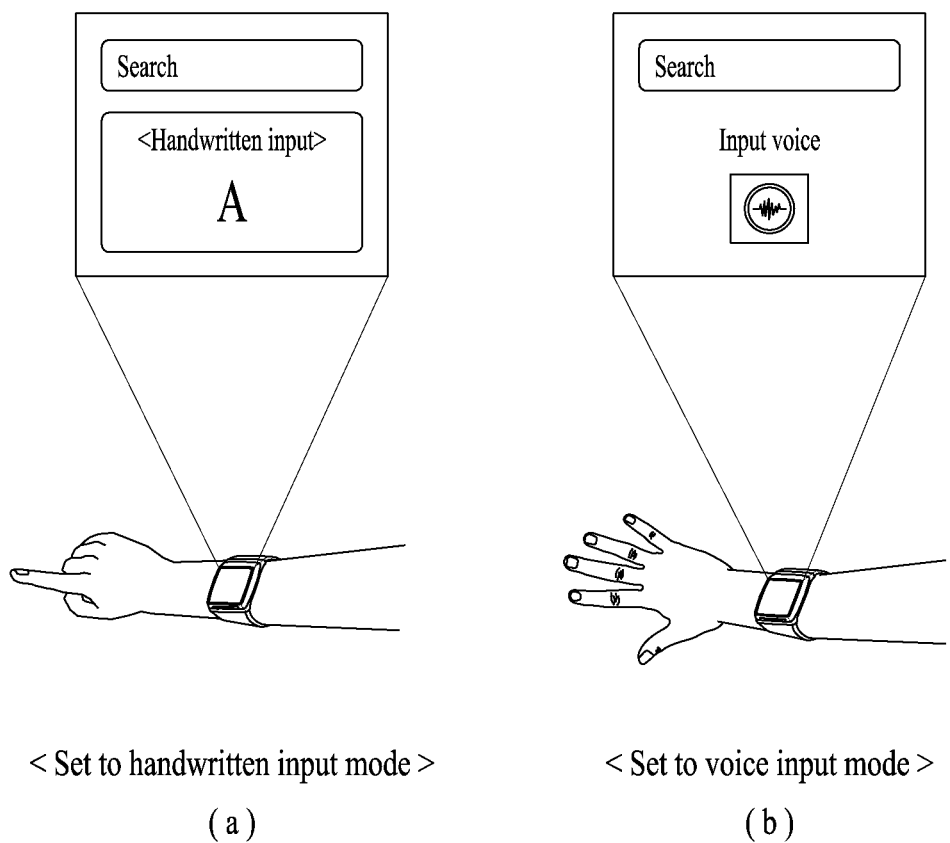
FIG. 22 is a diagram for one example to describe a process for a mobile terminal to enter a handwriting input mode and/or a voice input mode by a user gesture.

FIG. 22 is a diagram for one example to describe a process for the mobile terminal 100 to enter a handwriting input mode and/or a voice input mode by a user gesture.

Referring to FIG. 22, if a user gesture for entering the handwritten input mode and/or the voice input mode is inputted, the controller 180 can control the mobile terminal 100 to enter the handwritten input mode and/or the voice input mode. In doing so, the user gesture for entering the handwritten input mode may include an action of stretching a prescribed finger while folding the rest of fingers [FIG. 22 (a)], by which the present invention may be non-limited. And, the user gesture for entering the voice input mode may include an action of stretching all of 5 fingers [FIG. 22 (b)], by which the present invention may be non-limited. In case that a specific gesture is inputted, the controller 180 can control the mobile terminal 100 to enter both of the handwritten input mode and the voice input mode.

Figure 23:
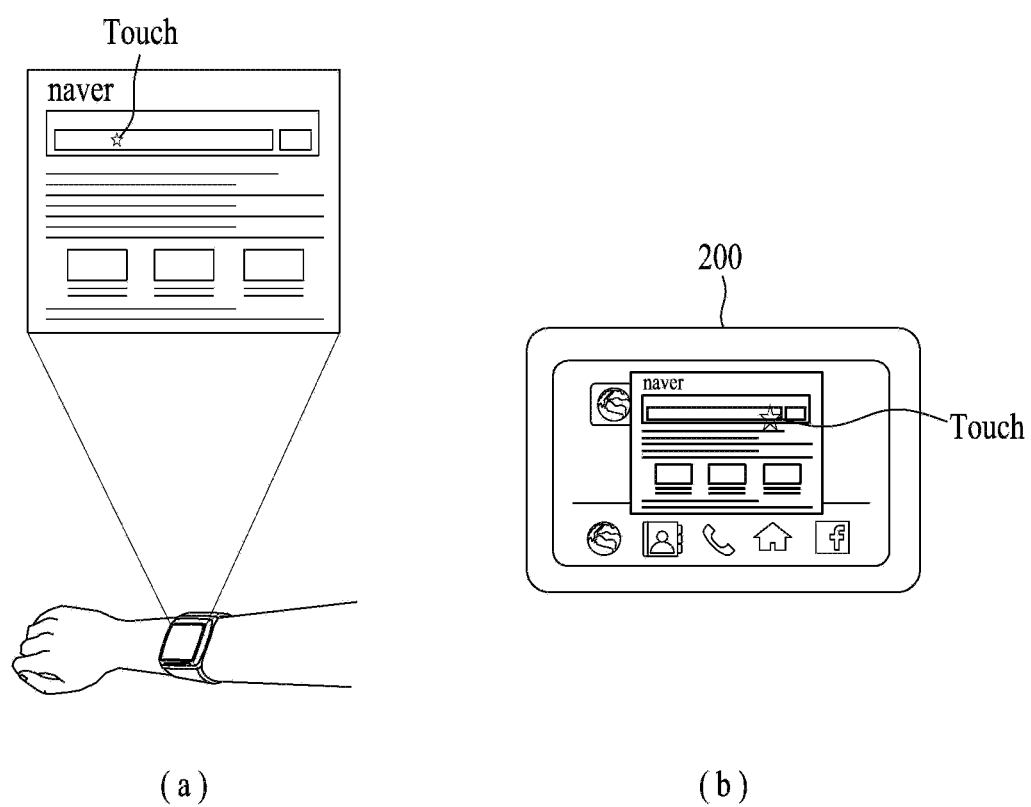
FIG. 23 is a diagram for one example of a process for a mobile terminal to enter a handwriting input mode and/or a voice input mode if a text needs to be inputted.

FIG. 23 is a diagram for one example of a process for the mobile terminal 100 to enter a handwriting input mode and/or a voice input mode if a situation of inputting a text occurs.

Referring to FIG. 23, if a situation that a text needs to be inputted through the mobile terminal 100 or the external device 200 (e.g., if an address input window is selected from a web browser, if a search word input window is selected from a portal site, if a document is currently edited, if an email is currently composed, if a text message is currently composed, etc.), the controller 180 can control the mobile terminal 100 to enter the handwritten input mode in order to facilitate a user to input a text. In doing so, the controller 180 discriminates a case that the mobile terminal 100 is in a self-control mode from a case that the mobile terminal 100 is in a remote control mode. Hence, the controller 180 controls the mobile terminal 100 to enter the handwritten input mode only if there occurs a situation that a text should be inputted to a device as a control target. For instance, referring to FIG. 23 (a), if there occurs a situation that a text needs to be inputted to the mobile terminal 100 [e.g., if a search window displayed through the mobile terminal 100 is touched], the controller 180 can enter the handwritten input mode and/or the voice input mode. While a mode of the mobile terminal 100 is set to the remote control mode, referring to FIG. 23 (b), if there occurs a situation that a text needs to be inputted to the external device 200 [e.g., if a search window displayed through the external device 200 is touched], the controller 180 can enter the handwritten input mode and/or the voice input mode. In particular, in the self-control mode, only if three occurs the situation that a text needs to be inputted to the mobile terminal 100, the handwritten input mode can be entered. In particular, in the remote control mode, only if three occurs the situation that a text needs to be inputted to the external device 200, the handwritten input mode can be entered.

Like the examples shown in FIG. 22 and FIG. 23, in order for a user to input a text remotely without touching a screen, the controller 180 can enter the handwritten input mode and/or the voice input mode.

The controller 180 can control a mode of the mobile terminal 100 to be set to one of the handwritten input mode and the voice input mode if necessary. Alternatively, the controller 180 can control the mode of the mobile terminal 100 to be simultaneously set to both of the handwritten input mode and the voice input mode. If the mode of the mobile terminal 100 is set to both of the handwritten input mode and the voice input mode, a user may be able to input a text using both a handwritten input and a voice input.

For another instance, the controller 180 discriminates a case of an occurrence of a situation that a text should be inputted to the mobile terminal 100 from a case of an occurrence of a situation that a text should be inputted to the external device 200. In the former case, a mode of the mobile terminal 100 can be set to the voice input mode (or the handwritten input mode). In the latter case, a mode of the mobile terminal 100 can be set to the handwritten mode (or the voice input mode).

For another instance, the controller 180 discriminates a case of an occurrence of a situation that a text should be inputted to the mobile terminal 100 by a voice command from a case of an occurrence of a situation that a text should be inputted to the mobile terminal 100 not by the voice command. In the former case, the controller 180 can set a mode of the mobile terminal 100 to the voice input mode. In the latter case, the controller 180 can set the mode of the mobile terminal to the handwritten input mode. For example, in case that a document editing function is enabled by a user's voice command, the mode of the mobile terminal 100 can be set to the voice input mode. If the document editing function is enabled by a user's gesture or a touch input, the mode of the mobile terminal 100 can be set to the handwritten input mode.

<Operation in Handwritten Mode>

In handwritten input mode, a user can input a text in a manner of moving fingers as if writing with the fingers. In particular, the controller 180 detects a movement of a user's finger trace and is able to control an appropriate text corresponding to a motion of a moved finger to be inputted to the mobile terminal 100 or the external device 200.

Figure 24:
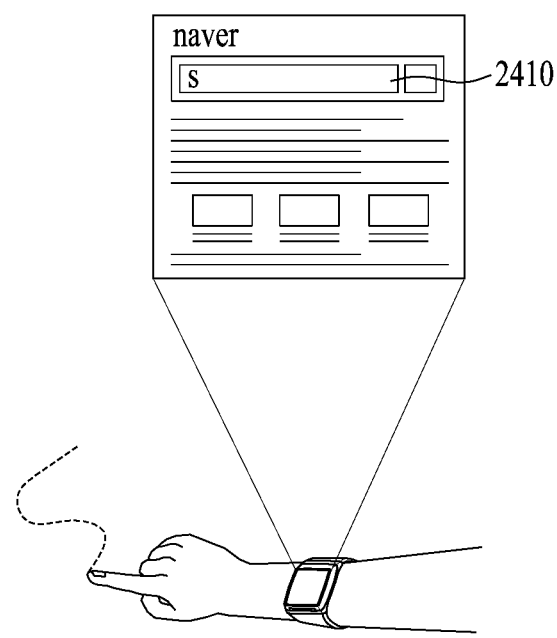

FIG. 24 and FIG. 25 are diagrams for examples to describe a process for inputting a text to the mobile terminal 100 and the external device 200 by a user's handwriting.

First of all, if there occurs a situation that a text should be inputted to the mobile terminal 100 in the self-control mode, the controller 180 can control the mobile terminal 100 to enter the handwritten input mode. In the handwritten input mode, if a user moves a finger as if writing with the finger, referring to FIG. 24, the controller 180 can control a text corresponding to a movement of the finger to be inputted to the mobile terminal 100. In the example shown in FIG. 24, in response to the movement of the finger, a text 's' is inputted to a search window.

Secondly, First of all, if there occurs a situation that a text should be inputted to the external device 200 in the remote control mode, the controller 180 can control the mobile terminal 100 to enter the handwritten input mode. In the handwritten input mode, if a user moves a finger as if writing with the finger, referring to FIG. 25, the controller 180 can control a text corresponding to a movement of the finger to be inputted to the external device 200. In the example shown in FIG. 25, in response to the movement of the finger, a text 's' is inputted to a search window.

In order to prevent a wrong or incorrect input, in the handwritten input mode, only if a user poses appropriately to input a handwriting, the mobile terminal 100 can control a handwriting recognition and text input operation to be performed. For instance, referring to FIG. 24 and FIG. 25, while a prescribed finger is stretched but the rest of fingers are folded, only if the stretched finger moves, the controller 180 can control a handwriting recognition and text input operation to be performed.

And, it is a matter of course that a text inputted by user's handwriting can be deleted by a gesture for deleting the inputted text [cf. FIG. 7, FIG. 16, FIG. 17].

In case that a text inputted by a user is inputted to a search word input window of a webpage, a search result may be displayed by a user's gesture for triggering a search. For instance, in case that a user hits a floor surface with a finger twice, the controller 180 can display a webpage that reflects a search result of a text inputted to a search word input window.

In the above-described example, if a movement of a finger is detected, the controller 180 extracts a text corresponding to the movement of the finger and then controls the extracted text to be inputted through the mobile terminal 100 or the external device 200.

Moreover, the controller 180 can control a handwritten input to be applied to the mobile terminal 100 or the external device 200 along a trace of a movement of a finger. In particular, the controller 180 can control a handwritten input drawn along a user's finger trace to be applied to the mobile terminal 100 or the external device 200 without extracting a text corresponding to the trace of the movement of the finger.

In doing so, a thickness of the inputted handwriting can increase or decrease in proportion to a strength when a user presses a floor surface with the finger. In particular, the strength on pressing the floor surface with the finger can be measured based on a sensing signal of the sensing unit 140 that sensed an extent of contraction (or relaxation) of a muscle on pressing the floor surface with the finger.

<Operation in Voice Input Mode>

First of all, in voice input mode, a user can input a control command or text to apply to the mobile terminal 100 or the external device 200 through a user's voice. In particular, the controller 180 converts a voice signal inputted through the microphone 122 to a text by STT (speech to text) and then processes a control command indicated by the corresponding text or controls the corresponding text to be inputted.

Figure 26:
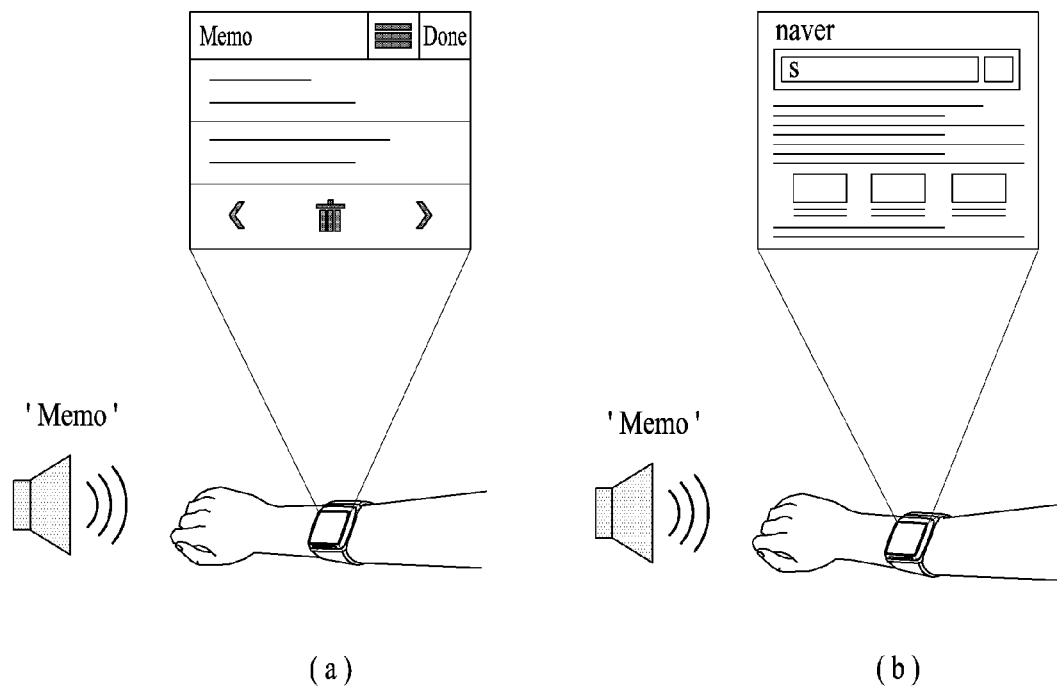

FIG. 26 and FIG. 27 are diagrams for examples to describe a process for remotely controlling the mobile terminal 100 and the external device 200 by a voice input.

Referring to FIG. 26, if a voice is inputted to the mobile terminal 100 in self-control mode, the controller 180 coverts the voice to a text by STT and is then able to process a control command corresponding to the text [FIG. 26 (a)]. In the example shown in FIG. 26 (a), if a user speaks a name of an application the user desires to activate, the corresponding application is activated. In particular, FIG. 26 (a) shows one example that a memo application is activated in response to a user's voice 'memo'. In case of an occurrence of a situation that a text should be inputted to the mobile terminal 100, when a user's voice is inputted, the controller 180 converts the inputted voice to a text by STT and is then able to control the corresponding text to be inputted [FIG. 26 (b)].

Referring to FIG. 27, if a voice is inputted to the mobile terminal 100 in remote control mode, the controller 180 coverts the voice to a text by STT and is then able to deliver a control command to the external device so that the control command corresponding to the text can be processed through the external device 200 [FIG. 27 (a)]. In the example shown in FIG. 27 (a), like the former example shown in FIG. 26, if a user speaks a name of an application the user desires to activate, the corresponding application is activated. In case of an occurrence of a situation that a text should be inputted to the external device 200, when a user's voice is inputted, the controller 180 converts the inputted voice to a text by STT and is then able to deliver the corresponding text to the external device 200 so that the corresponding text can be inputted to the external device [FIG. 27 (b)].

<Display of Supplementary Information>

The mobile terminal 100 and the external device 200 can work as devices supplementary to each other. This is described in detail with reference to the accompanying drawings as follows.

Figure 28:
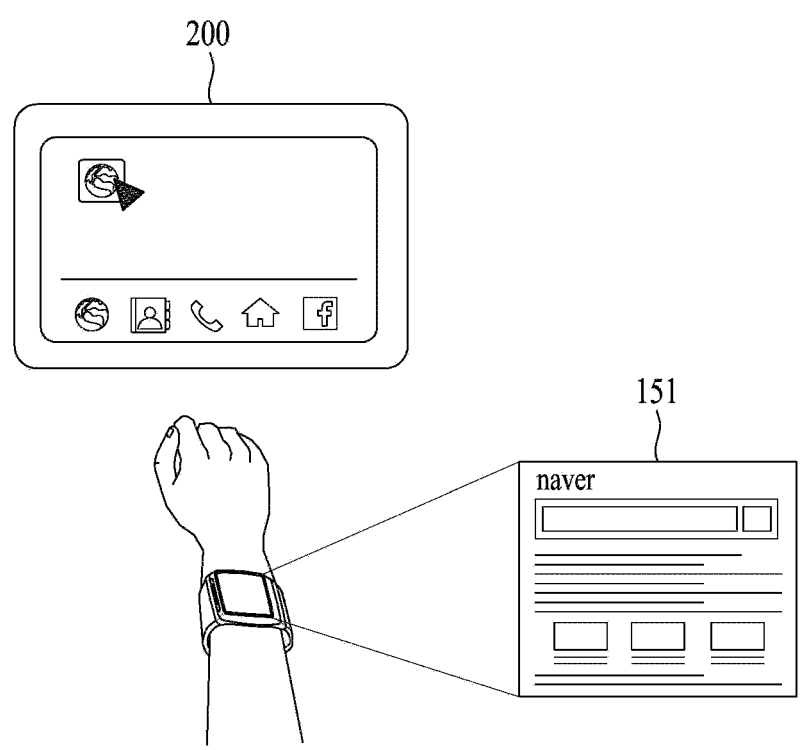
FIG. 28 is a diagram for one example of a process for outputting a preview image of an object selected from an external device through a mobile terminal.

If a prescribed object is selected from one of the mobile terminal 100 and the external device 200, a preview image of the selected object can be displayed on the other. For instance, FIG. 28 is a diagram for one example of a process for outputting a preview image of an object selected form the external device 200 through the mobile terminal 100. Referring to FIG. 28, if a prescribed object (e.g., an application activation icon) is selected through the external device 200, the controller 180 receives a preview image (e.g., a driven image when an application is activated) of the selected object from the external device 200 and is then able to control the received preview image to be outputted through the display unit 151. If the selected object is an icon of such a content as an e-book, an image, a video and the like, a preview image of one of the e-book, the image, the video and the like may be outputted.

Moreover, if a prescribed object is selected from the mobile terminal 100, the controller 180 transmits a preview image of the selected prescribed object to the external device 200 and is then able to control the preview image of the selected object to be outputted through the external device 200 [not shown in the drawing].

Figure 29:
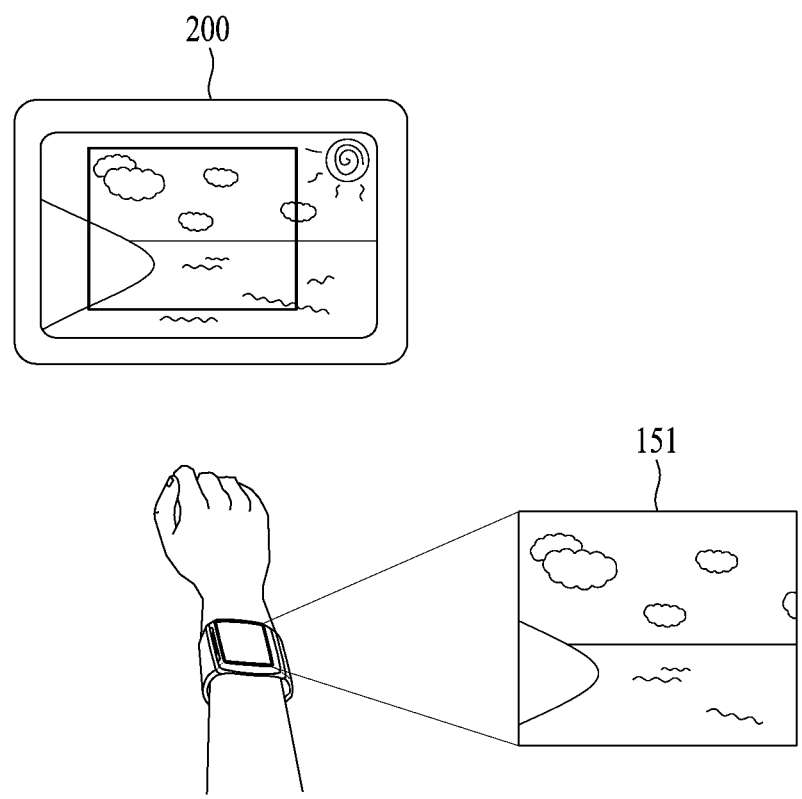
FIG. 29 is a diagram for one example of a process for displaying an enlarged content and a mini-map of the enlarged content through a mobile terminal and an external device, respectively.

If a content is enlarged and displayed on one of the mobile terminal 100 and the external device 200 (i.e., if a prescribed portion of the content is displayed only), a mini-map of the content can be displayed on the other. For instance, FIG. 29 is a diagram for one example of a process for displaying an enlarged content and a mini-map of the enlarged content through the mobile terminal 100 and the external device 200, respectively. Referring to FIG. 29, if a content displayed through the mobile terminal 100 is enlarged, the controller 180 can control a mini-map of the enlarged content to be displayed through the external device 200. In particular, the controller 180 provides the external device 200 with the content (or the preview image of the content) and coordinates information of a part currently outputted from the mobile terminal 100, thereby controlling the external device 200 to display the mini-map of the content displayed on the mobile terminal 100 by being enlarged.

Moreover, if a content is enlarged in the external device 200, a mini-map of a content displayed through the external device 200 may be outputted from the mobile terminal 100 [not shown in the drawing].

Figure 30:
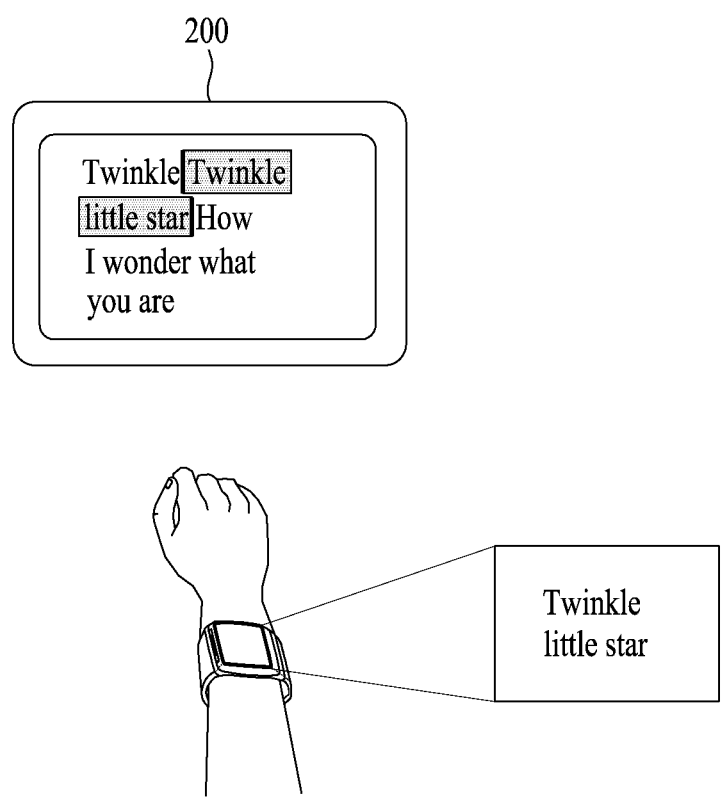
FIG. 30 is a diagram for one example of a process for a mobile terminal to display data saved in a clipboard of an external device.

One of the mobile terminal 100 and the external device 200 can display a data (i.e., a temporarily saved data) saved in a clipboard of the other. For instance, FIG. 30 is a diagram for one example of a process for the mobile terminal 100 to display a data saved in a clipboard of the external device 200. Referring to FIG. 30, if a prescribed data is copied to a clipboard in the external device 200 (i.e., temporarily saved in the clipboard), the controller 180 receives the data copied to the clipboard from the external device 200 and is then able to control the received data to be displayed. For instance, like the example shown in FIG. 30, if a text is temporarily saved in the external device 200, the controller 180 receives the data temporarily saved in the external device 200 and is then able to control the received data to be outputted through the display unit 151.

Moreover, the controller 180 can control a data temporarily saved in the mobile terminal to be outputted to the external device 200 [not shown in the drawing]. To this end, the controller 180 can transmit the temporarily saved data to the external device 200.

Figure 31:
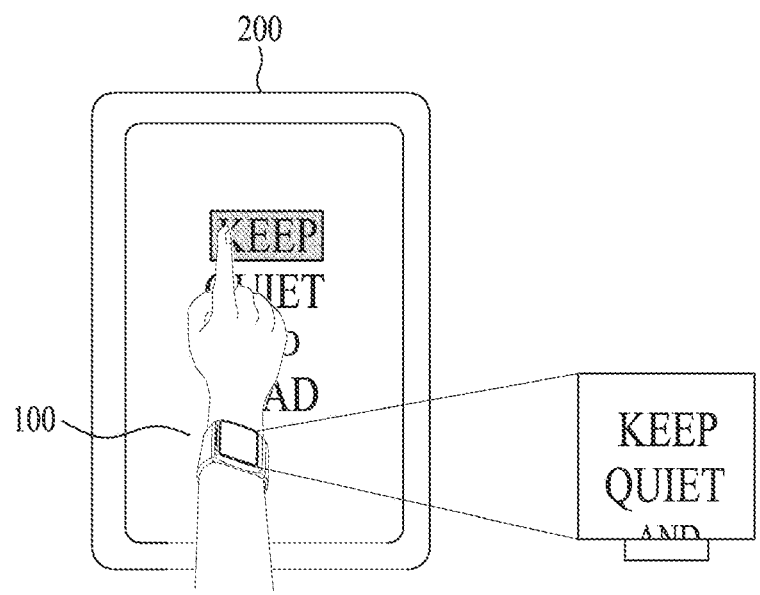
FIG. 31 is a diagram for one example that a content enlarged centering on a specific region of a content outputted through an external device is displayed through a mobile terminal.

If a specific region (or a specific point) of a content currently displayed one of the mobile terminal 100 and the external device 200 is selected, the other can control the content to be enlarged and displayed centering on the selected region (or point). For instance, FIG. 31 is a diagram for one example that a content enlarged centering on a specific region of a content outputted through the external device 200 is displayed through the mobile terminal 100. Referring to FIG. 31, if a specific region of a content outputted through the external device 200 is selected, the controller 180 receives the content (or a preview image of the content) and a coordinates information of the selected region from the external device 200 and is then able to enlarge and display the content centering on the specific region selected through the external device 200.

Moreover, if a specific region of a content displayed through the mobile terminal 100 is selected, the controller 180 can control the content, which is enlarged centering on the specific region, to be displayed through the external device 200 [not shown in the drawing]. To this end, the controller 180 may be able to provide the external device 200 with the content (or a preview image of the content) and a coordinates information of the selected region.

As mentioned in the foregoing descriptions with reference to FIGS. 28 to 31, the controller 180 can control supplementary information to be displayed through one of the mobile terminal 100 and the external device 200 for the other. In the examples shown in FIGS. 28 to 31, as the supplementary informations displayable through the mobile terminal 100 and the external device 200, the preview image (cf. FIG. 28), the mini-map (cf. FIG. 29), the data saved in the clipboard (cf. FIG. 30) and the enlarged image (cf. FIG. 31) are enumerated.

Aside from the enumerated supplementary informations, the supplementary informations may further include a metadata (e.g., exif data of a photo file, etc.) for a content, a dictionary definition of a word, and the like. In particular, while a content is outputted from one of the mobile terminal 100 and the external device 200, a metadata of the corresponding content can be outputted from the other. If a word is selected from one of the mobile terminal 100 and the external device 200, a dictionary definition of the selected word can be outputted from the other.

<Mirroring Operation>

If a gesture for mirroring is inputted by a user, the controller 180 can control the mirroring between the mobile terminal 100 and the external device 200 to be initiated. Once the mirroring is initiated, the external device 200 can output a screen identical to an output screen of the mobile terminal 100.

FIG. 32 is a diagram for one example to describe a process for initiating a mirroring between the mobile terminal 100 and the external device 200e in response to an input of a gesture for the mirroring.

Referring to FIG. 32, if a gesture for a mirroring is inputted, the controller 180 can control the external device 200 to output the same screen of the mobile terminal 100. In particular, in order for the external device 200 to output the same output of the mobile terminal 100, the controller 180 can transmit a video signal of the mobile terminal 100 to the external device 200.

In the example shown in FIG. 32, an action of stretching all of 5 fingers is taken as an example of the gesture for the mirroring. The controller 180 may be able to determine that the user gesture for the mirroring has been inputted based on a sensing signal of sensing a muscle movement on stretching all of the 5 fingers.

Moreover, the controller 180 may receive a video signal from the external device 200 in order for the mobile terminal 100 to output the same output of the external device 200 [not shown in the drawing].

If a content list is outputted through the display unit 151, the controller 180 can control a prescribed content specified in the content list to be displayed through the external device 200. This is described in detail with reference to FIG. 33 as follows.

Figure 33:
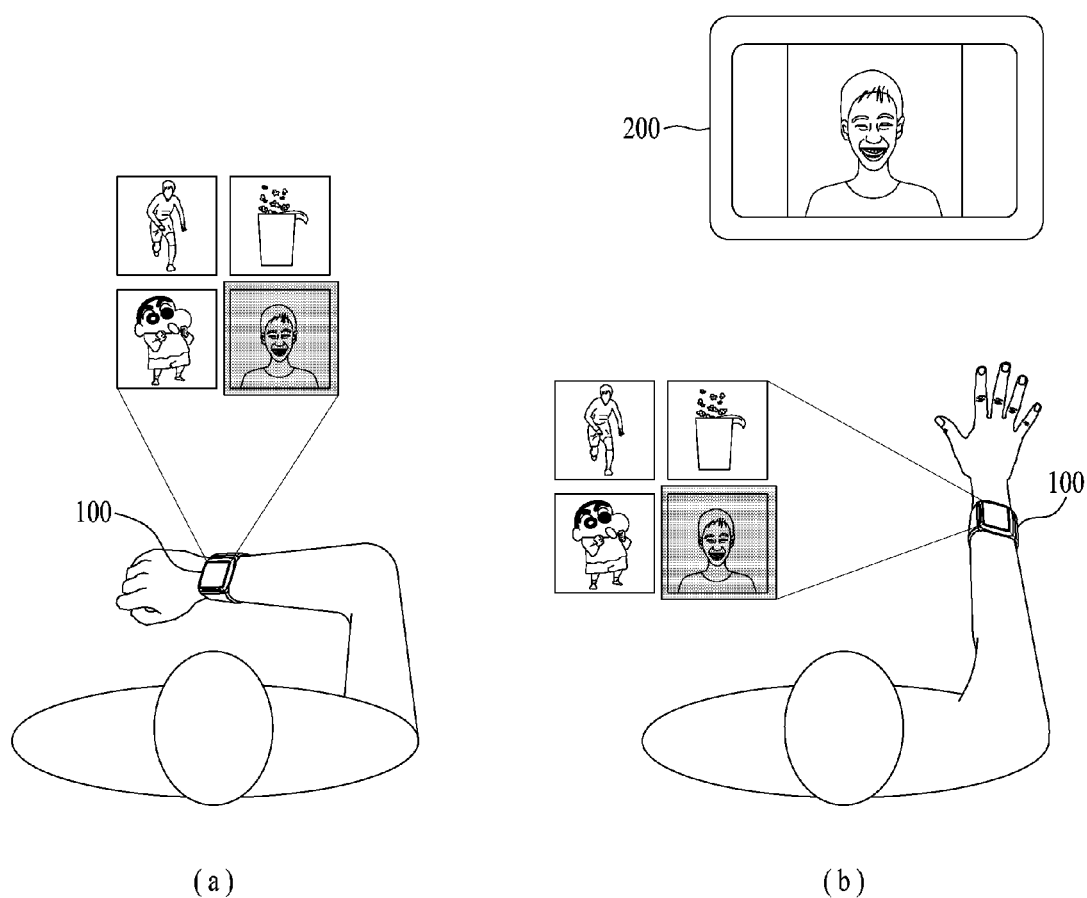
FIG. 33 is a diagram for one example that a prescribed content specified in a content list currently outputted from a mobile terminal is displayed through an external device.

FIG. 33 is a diagram for one example that a prescribed content specified in a content list currently outputted from the mobile terminal 100 is displayed through the external device 200.

Referring to FIG. 33, when a content list is displayed through the mobile terminal 100, if a gesture for specifying a prescribed content in the content list and a gesture for a mirroring are consecutively inputted, the controller can control the specified content in the content list to be displayed through the external device 200. For instance, after a user gesture for specifying a specific content in the content list has been inputted [FIG. 33 (a)], if a user gesture for displaying the specified prescribed content on the external device 200 is then inputted, the controller 180 can control the specified content to be displayed through the external device 200. Hence, the specified content in the content list can be displayed on the external device 200, whereas the content list is displayed on the mobile terminal 100.

In this case, the user gesture for specifying a prescribed content in the content list may include an action of a clutch with fingers and the user gesture for commanding a display of the specified content may include an action of stretching the clutched fingers, by which the present invention may be non-limited. In the example shown in FIG. 33, the content selected by the user gesture is enclosed within a visually recognizable outline such that the content selected by a user can be visually identified.

In doing so, since the action of specifying a prescribed content in the content list controls an operation of the mobile terminal 100, it may be preferably inputted while the mobile terminal 100 is in the self-control mode (e.g., when an arm is bent inward (cf. FIG. 6)), by which the present invention may be non-limited. Since the user gesture for displaying the specified content through the external device 200 controls the output of the external device 200, it may be preferably inputted while the mobile terminal 100 is in the remote control mode (e.g., when the arm is stretched (cf. FIG. 6)), by which the present invention may be non-limited.

Besides, the controller 180 can control a prescribed content specified in the content list, which is currently outputted through the external device 200, to be outputted through the mobile terminal 100 [not shown in the drawing].

<Subdivision of Operating Mode of Mobile Terminal 100>

According to the embodiments mentioned in the foregoing descriptions, control operations by user gestures include a pointer control, an entry into a handwritten input mode, a page turning and the like. If a different gesture is assigned to each of the control operations, a user can create a desired control command by memorizing an operation associated with the corresponding gesture.

Yet, if there are too many gestures that should be memorized by a user, it may cause a problem that the user is unable to create a desired control command appropriately.

Therefore, if the controller 180 subdivides an operating mode of the mobile terminal 100 into at least two modes, although a same gesture is inputted, it may be able to create an appropriate control command depending on whether the mobile terminal 100 operates in which operating mode. This can bring an effect such that the number of gestures supposed to be memorized by a user can be remarkably decreased.

For instance, the controller 180 can determine an operating mode of the mobile terminal 100 through a contact size between a palm of an arm having the mobile terminal 100 worn thereon and a floor surface. This is described in detail with reference to FIG. 34 as follows.

FIG. 34 is a diagram to describe a process for determining an operating mode of the mobile terminal 100 through a size of a contact between a palm and a floor surface.

Referring to FIG. 34 (a), if a contact size between a palm and a floor surface is small due to folded fingers, the controller 180 can determine that the mobile terminal 100 has entered a mouse mode for a pointer control. On the other hand, referring to FIG. 34 (b), if a contact size between a palm and a floor surface is large due to stretched fingers, the controller 180 can determine that the mobile terminal 100 has entered a handwritten input mouse for a handwritten input. Moreover, referring to FIG. 34 (c), when fingers are stretched or a palm hovers in the air without contacting with a floor surface, the controller 180 can determine that the mobile terminal 100 has entered a hovering mode.

If a specific gesture is inputted, the controller 180 can apply a different control command depending on a current operating mode. For instance, if the mobile terminal 100 is moved in the mouse mode, it may be performed to move a pointer. For another instance, if the mobile terminal 100 is moved in the handwritten input mode, it may be performed to delete an inputted handwriting (or an inputted text). For further instance, if the mobile terminal 100 is moved in the hovering mode, it may be performed to turn a page.

Thus, as mentioned in the above description, the controller 180 can determine a function, which is to be mapped to a specific gesture, depending on a current input mode of the mobile terminal 100.

<Determination of Location of User's Hand Having Mobile Terminal 100 Worn Thereon>

In order to obtain a precise muscle movement, it is important to determine a location of a user's hand having the mobile terminal 100 worn thereon. For instance, when a second finger on a left side is determined as moving, if the mobile terminal 100 is worn on the left side, a ring finger can be determined as moving. If the mobile terminal 100 is worn on a right side, a forefinger can be determined as moving. Hence, in order to obtain a moving finger precisely, information indicating whether a user wears the mobile terminal may be necessary.

The mobile terminal can determine a location of a hand having the mobile terminal 100 worn thereon by receiving an input of a frequently used hand from a user. Alternatively, the mobile terminal 100 can determine a location of an arm having the mobile terminal 100 worn thereon by analyzing a motion of the mobile terminal 100 while the mobile terminal 100 is worn. For instance, if the mobile terminal 100 is mainly swung clockwise (e.g., an action of folding user's left arm inward) and then swung back counterclockwise (e.g., an action of stretching the folded left arm), the controller 180 can recognize that the mobile terminal 100 is worn on a left hand. On the contrary, if the mobile terminal 100 is mainly swung counterclockwise (e.g., an action of folding user's right arm inward) and then swung back clockwise (e.g., an action of stretching the folded right arm), the controller 180 can recognize that the mobile terminal 100 is worn on a right hand.

Accordingly, embodiments of the present invention provide various effects and/or features.

First of all, the present invention can provide a mobile terminal for enhancing user's convenience.

Secondly, the present invention can remotely control a mobile terminal of a watch type.

Thirdly, the present invention can remotely control an external device using a mobile terminal of a watch type.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal of a watch type wearable on a user's wrist, comprising:
 a display unit configured to display information;
 a wireless communication unit configured to communicate with an external device as a target of a remote control;
 a sensing unit configured to sense a motion of the mobile terminal and a variation according to a muscle movement of a part having the mobile terminal worn thereon; and a controller configured to:
create a control command for remotely controlling either the mobile terminal or the external device based on a sensing signal of the sensing unit,
create the control command depending on one of a first combination and a second combination,
wherein the first combination is comprised of the motion of the mobile terminal and a sound generated from the motion of the mobile terminal, and
wherein the second combination is comprised of a motion of a finger of an arm having the mobile terminal worn thereon and a sound generated from the motion of the finger, and
determine a control mode based on a location of an arm having the mobile terminal worn thereon, wherein the control mode includes a self-control mode controlling the mobile terminal and a remote control mode controlling the external device.

2. The mobile terminal of claim 1, wherein if the motion of the mobile terminal or the motion of the finger is detected, the controller creates the control command for moving a pointer displayed on the mobile terminal or the external device along the motion of the mobile terminal or the motion of the finger.

3. The mobile terminal of claim 2, wherein if a motion of bobbing the finger is detected, the controller creates the control command for clicking a point indicated by the pointer.

4. The mobile terminal of claim 3, wherein the controller controls a feedback of clicking the point indicated by the pointer to be outputted.

5. The mobile terminal of claim 1, wherein if a motion of tapping a floor surface with two fingers is detected, the controller creates the control command for selecting a data within an area set by end and start points from data displayed through the display unit or the external device.

6. The mobile terminal of claim 5, wherein a location of the start point is changed in response to a motion of one of the two fingers, and
wherein a location of the end point is changed in response to a motion of the other.

7. The mobile terminal of claim 1, wherein if the motion of the arm having the mobile terminal worn thereon in the air is detected, the controller creates the control command for performing a page turning to be performed on the mobile terminal or the external device.

8. The mobile terminal of claim 1, wherein if there occurs a situation that a text should be inputted to at least one of the mobile terminal or the external device, the controller controls a mode of the mobile terminal to be set to at least one of a handwritten input mode or a voice input mode.

9. The mobile terminal of claim 8, while the mode of the mobile terminal is set to the handwritten input mode, if the motion of the finger is detected, the controller inputs a text corresponding to the motion of the finger to be inputted to at least one of the mobile terminal or the external device.

10. The mobile terminal of claim 8, wherein while the mode of the mobile terminal is set to the voice input mode, if a user's voice is inputted, the controller inputs a text converted from the voice to the at least one of the mobile terminal or the external device.

11. The mobile terminal of claim 1, wherein if an icon is selected from one of the display unit and the external device, the controller controls a preview of the selected icon to be displayed through the other one of the mobile terminal and the external device.

12. The mobile terminal of claim 1, wherein if a content currently outputted through one of the mobile terminal and the external device is displayed by being enlarged, the controller controls a mini-map of the content to be displayed through the other one of the mobile terminal and the external device.

13. The mobile terminal of claim 1, wherein if a prescribed content is selected from a content list displayed through the display unit, the controller controls the selected content to be displayed through the external device.

14. The mobile terminal of claim 1, wherein if the arm having the mobile terminal worn thereon is bent, the control command is applied to the mobile terminal, and
wherein if the arm having the mobile terminal worn thereon is stretched, the control command is applied to the external device.

15. A method of controlling a mobile terminal of a watch type wearable on a user's wrist, comprising steps of:
sensing, via a sensing unit, a motion of the mobile terminal and a variation according to a muscle movement of a part having the mobile terminal worn thereon;
remotely controlling, via a controller, either the mobile terminal or an external device based on a control command,
wherein the control command is created depending on one of a first combination and a second combination,
wherein the first combination is comprised of the motion of the mobile terminal and a sound generated from the motion of the mobile terminal, and
wherein the second combination is comprised of a motion of a finger of an arm having the mobile terminal worn thereon and a sound generated from the motion of the finger; and
determining, via the controller, a control mode based on a location of an arm having the mobile terminal worn thereon, wherein the control mode includes a self-control mode controlling the mobile terminal and a remote control mode controlling the external device.

* * * * *